United States Patent
Wight et al.

(10) Patent No.: US 10,439,444 B2
(45) Date of Patent: Oct. 8, 2019

(54) WIRELESS ENERGY TRANSFER USING ALIGNMENT OF ELECTROMAGNETIC WAVES

(71) Applicant: Teslonix Inc., Ottawa (CA)

(72) Inventors: James Stuart Wight, Ottawa (CA); Rony Everildo Amaya, Kanata (CA); Cezary Paul Slaby, Ottawa (CA)

(73) Assignee: Teslonix Inc., Ottawa (CA)

( * ) Notice: Subject to any disclaimer, the term of this patent is extended or adjusted under 35 U.S.C. 154(b) by 495 days.

(21) Appl. No.: 14/923,847

(22) Filed: Oct. 27, 2015

(65) Prior Publication Data

US 2016/0126753 A1  May 5, 2016

Related U.S. Application Data

(60) Provisional application No. 62/136,142, filed on Mar. 20, 2015, provisional application No. 62/073,448,
(Continued)

(51) Int. Cl.
*H02J 50/40* (2016.01)
*H02J 50/20* (2016.01)
*H02J 50/90* (2016.01)

(52) U.S. Cl.
CPC .............. *H02J 50/40* (2016.02); *H02J 50/20* (2016.02); *H02J 50/90* (2016.02)

(58) Field of Classification Search
CPC .. H02J 50/40; H02J 50/90; H02J 50/20; H02J 7/025; H02J 17/00; B60L 8/00;
(Continued)

(56) References Cited

U.S. PATENT DOCUMENTS 3,510,788 A * 5/1970 Wollesen ................ H03D 3/18
329/324
3,534,294 A * 10/1970 Auer .................... H03B 5/1228
331/109
(Continued)

FOREIGN PATENT DOCUMENTS

JP      2011199975 A    10/2011
WO   2007084716 A3    12/2007
(Continued)

OTHER PUBLICATIONS

Jing Feng et al, "Energy-efficient transmission for beamforming in wireless sensor networks," Sensor Mesh and Ad Hoc Communications and Networks (SECON), 2010 7th Annual IEEE Communications Society Conference on. IEEE, 2010; 9 pages.
(Continued)

*Primary Examiner* — Bernarr E Gregory
*Assistant Examiner* — Nuzhat Pervin
(74) *Attorney, Agent, or Firm* — Atesa Legal PLLC

(57) ABSTRACT

A method for wireless energy transfer includes forming a plurality of energy beams. Each energy beam includes one or more electromagnetic (EM) waves having a same fundamental frequency as another EM wave of another one of the energy beams. A device response of an energizable device to the plurality of energy beams incident thereon is tracked. The one or more EM waves for each of the plurality of energy beams is directed to power the energizable device. A respective phase of the one or more EM waves for at least one of the energy beams is aligned to another phase of another EM wave of another one of the energy beams. A received power level received by the energizable device is maximized according to the device response by optimizing for at least one of the energy beams, the directing, and the aligning of the phase, of the one or more EM waves.

20 Claims, 12 Drawing Sheets

Related U.S. Application Data filed on Oct. 31, 2014, provisional application No. 62/085,450, filed on Nov. 28, 2014, provisional application No. 62/129,325, filed on Mar. 6, 2015.

(58) Field of Classification Search
CPC .......... H01Q 1/366; H01Q 13/02; H05H 7/02; H05H 1/0081; G02B 27/0087; F24J 2/1047; G02F 1/01; G01R 31/3025; H04B 10/1125; G01J 5/0003; H03F 3/165; H03F 1/0261; H03B 5/1228; H03D 3/18; B82Y 10/00; H03L 7/24
USPC ........................................................ 342/369
See application file for complete search history.

(56) References Cited

U.S. PATENT DOCUMENTS

| | | | | |
|---|---|---|---|---|
| 4,103,260 A * | 7/1978 | Buchman | ................. | G02F 1/01 359/250 |
| 4,241,316 A * | 12/1980 | Knapp | ................... | H03F 3/165 330/151 |
| 4,348,676 A * | 9/1982 | Tom | ....................... | G01S 3/023 342/151 |
| 4,496,909 A * | 1/1985 | Knapp | ................... | H03F 3/165 330/149 |
| 4,503,403 A * | 3/1985 | Taylor | ..................... | H03L 7/24 331/117 FE |
| 4,710,977 A * | 12/1987 | Lemelson | .......... | H04B 10/1125 398/106 |
| 5,218,366 A * | 6/1993 | Cardamone | .............. | B63C 9/21 200/549 |
| 5,400,036 A | 3/1995 | Kochiyama et al. | | |
| 5,883,829 A * | 3/1999 | van der Wagt | ........ | B82Y 10/00 257/197 |
| 6,184,696 B1 * | 2/2001 | White | ................ | G01R 31/3025 250/310 |
| 6,798,716 B1 * | 9/2004 | Charych | ................. | H02J 17/00 367/119 |
| 6,882,227 B2 | 4/2005 | Barry | ..................... | H03F 1/0261 330/285 |
| 6,967,462 B1 * | 11/2005 | Landis | ................... | H02J 17/00 320/101 |
| 7,068,991 B2 | 6/2006 | Parise | | |
| 7,482,273 B1 * | 1/2009 | Klein | ..................... | H01Q 1/366 343/905 |
| 7,566,889 B1 * | 7/2009 | Klein | ................ | G02B 27/0087 250/503.1 |
| 7,626,134 B1 * | 12/2009 | Klein | ................... | H05H 1/0081 219/121.36 |
| 7,711,441 B2 * | 5/2010 | Tillotson | ................... | B60L 8/00 700/59 |
| 8,232,748 B2 * | 7/2012 | Treas | ....................... | H05H 7/02 250/390.1 |
| 8,258,882 B2 | 9/2012 | Shibasaki et al. | | |
| 8,384,314 B2 * | 2/2013 | Treas | ....................... | H05H 7/02 250/390.1 |
| 8,760,743 B2 * | 6/2014 | Lal | ..................... | G02B 26/0841 359/198.1 |
| 8,948,847 B2 * | 2/2015 | Afsar | ..................... | H01Q 13/02 600/430 |
| 9,124,125 B2 | 9/2015 | Leabman et al. | | |
| 9,384,376 B2 | 7/2016 | Sabesan et al. | | |
| 9,787,103 B1 | 10/2017 | Leabman et al. | | |
| 2006/0001509 A1 * | 1/2006 | Gibbs | ..................... | G01N 21/21 333/202 |
| 2006/0108421 A1 | 5/2006 | Becker et al. | | |
| 2008/0068174 A1 | 3/2008 | Al-Mahdawi | | |
| 2008/0231449 A1 | 9/2008 | Moshfeghi | | |
| 2008/0275572 A1 * | 11/2008 | Tillotson | ................... | B60L 8/00 700/1 |
| 2009/0315412 A1 | 12/2009 | Yamamoto et al. | | |
| 2010/0188027 A1 * | 7/2010 | Treas | ....................... | H05H 7/02 315/505 |
| 2010/0315045 A1 * | 12/2010 | Zeine | ..................... | H02J 7/025 320/137 |
| 2011/0080267 A1 | 4/2011 | Clare et al. | | |
| 2012/0162010 A1 * | 6/2012 | Georgiadis | .............. | E02D 29/14 342/374 |
| 2012/0313577 A1 | 12/2012 | Moes et al. | | |
| 2013/0016814 A1 * | 1/2013 | Treas | ....................... | H05H 7/02 378/106 |
| 2013/0137455 A1 * | 5/2013 | Xia | ........................ | H02J 17/00 455/456.1 |
| 2013/0303901 A1 * | 11/2013 | Afsar | ..................... | H01Q 13/02 600/430 |
| 2014/0043487 A1 * | 2/2014 | Marandos | ............. | G01J 5/0003 348/164 |
| 2014/0078568 A1 * | 3/2014 | Lal | ..................... | G02B 26/0841 359/225.1 |
| 2014/0080264 A1 | 3/2014 | Chan et al. | | |
| 2014/0138432 A1 | 5/2014 | Park et al. | | |
| 2014/0175893 A1 * | 6/2014 | Sengupta | .............. | H01Q 21/225 307/104 |
| 2014/0266480 A1 * | 9/2014 | Li | ........................ | H03B 5/1228 331/117 FE |
| 2014/0354064 A1 * | 12/2014 | Tseliakhovich | ......... | H02J 17/00 307/104 |
| 2015/0022009 A1 | 1/2015 | Leabman et al. | | |
| 2015/0318730 A1 | 11/2015 | Bhargava et al. | | |
| 2015/0340875 A1 * | 11/2015 | Prasad | .................. | G06F 1/3203 307/104 |
| 2016/0042206 A1 | 2/2016 | Pesavento et al. | | |
| 2017/0116443 A1 | 4/2017 | Bolic et al. | | |
| 2017/0149294 A1 | 5/2017 | Wight et al. | | |
| 2019/0181691 A1 | 6/2019 | Wight et al. | | |

FOREIGN PATENT DOCUMENTS

| | | | |
|---|---|---|---|
| WO | 2014102828 A2 | 7/2014 | |
| WO | WO-2014102828 A2 * | 7/2014 | ........... G06F 1/3203 |

OTHER PUBLICATIONS

Stefan Berger et al., "Carrier Phase Synchronization of Multiple Distributed Nodes in a Wireless Network," Signal Processing Advances in Wireless Communications, 2007, SPAWC 2007, IEEE 8th Workshop on. IEEE 2007; 5 pages.

PCT International Search Report and Written Opinion for PCT/IB2017/000162, dated Jun. 16, 2017; 8 pages.

PCT International Search Report and Written Opinion for PCT/IB2017/000174, dated Jun. 9, 2017; 10 pages.

Korean Non-Final Office Action for 10-2017-7011095, dated Jun. 8, 2018; 8 pages.

GS1 EPCGLOBAL INC., "EPC Radio-Frequency Identity Protocols Generation-2 UHF RFID," Specification for RFID Air Interface Protocol for Communications at 860 Mhz-960 Mhz, Version 2.01 Ratified; 152 pages.

Notice of Allowance for U.S. Appl. No. 15/424,752, dated Nov. 16, 2018; 10 pages.

PCT International Search Report and Written Opinion for PCT/IB2015/002192, dated Jan. 21, 2016; 8 pages.

Wight et al., "A Microstrip and Stripline Crossover Structure," IEEE Transactions on Microwave Theory and Techniques, May 1976; 1 page.

European Patent Office Search Report for 15855996.3, nationalized from PCT/IB2015002192, dated Feb. 13, 2018; 10 pages.

EPO Office Action for Application No. 15 855 996.3, dated Nov. 26, 2018; 5 pages.

Non-Final Office Action dated Jul. 17, 2019 for U.S. Appl. No. 15/398,641, 21 pages.

* cited by examiner

WIRELESS ENERGY TRANSFER USING ALIGNMENT OF ELECTROMAGNETIC WAVES

CROSS-REFERENCE TO RELATED APPLICATIONS

This application is a utility application claiming priority to U.S. Provisional Application Ser. No. 62/073,448 filed on Oct. 31, 2014 entitled "DISTANCE WIRELESS CHARGING USING CHARGING STATIONS," U.S. Provisional Application Ser. No. 62/085,450 filed on Nov. 28, 2014 entitled "WIRELESS POWER TRANSFER AS APPLIED TO SOLAR PANELS," U.S. Provisional Application Ser. No. 62/129,325 filed on Mar. 6, 2015 entitled "WIRELESS POWER TRANSFER USING ELECTROMAGNETIC WAVES ALIGNMENT," and U.S. Provisional Application Ser. No. 62/136,142 filed on Mar. 20, 2015 entitled "WIRELESS POWER TRANSMISSION," the entireties of which are incorporated by reference herein.

FIELD

This disclosure relates generally to wireless energy transfer, and more specifically to efficient systems and methods for the wireless transfer of energy using alignment of electromagnetic waves.

BACKGROUND

Increased processing and connectivity capabilities of portable devices have resulted in a corresponding increase in the energy consumption of these devices. Furthermore, there are practical physical limits as to how much energy a portable device can store, thus necessitating frequent charging of these devices. Tethered solutions to powering portable devices are limited in part due to a lack of standardization of the connectors between the power cable and device, the weight and reliability of the charging cables, restrictions on the operating environment (e.g. underwater or hazardous areas), and the general constraints on mobility that tethered solutions impose.

Wireless charging of portable devices, has previously been limited to short distances (e.g. on the order of centimeters) by near-field techniques such as inductive or capacitive coupling. Far-field techniques that use lasers or microwave beams involve dangerously high power levels, particularly in an environment including humans. Lasers and microwave beams are also typically limited to line-of-sight applications.

Improvements in the capabilities of portable devices have also helped enable an environment of an Internet of Things (IoT) wherein large and dense deployments of devices could collectively share information. However, previous solutions have been limited in their ability to efficiently power devices in an IoT environment, where the devices require mobility, and have significantly different power consumption requirements. Similarly, increased usage of Radio Frequency Identification (RFID) tags requires an efficient way of powering devices in a mobile environment without tethering, using dangerously high levels of power, or imposing undue restrictions on the placement of charging stations used to charge the RFID tags.

BRIEF SUMMARY

As will be appreciated, embodiments as disclosed herein include at least the following. In one embodiment, a system for wireless energy transfer comprises a tracking module configured to determine a device response of an energizable device to an energy beam incident thereon, the energy beam comprising one or more electromagnetic (EM) waves. A first beamforming module is configured to direct a first one of the one or more EM waves to power the energizable device. A second beamforming module is physically separate from the first beamforming module and is configured to direct a second one of the one or more EM waves to power the energizable device, wherein the first EM wave has a first fundamental frequency equal to a second fundamental frequency of the second EM wave. A phase alignment module is configured to align, at the device, a first phase of the first EM wave with a second phase of the second EM wave. A processing module is configured to communicate with at least one of the tracking module, the first beamforming module, the second beamforming module and the phase alignment module to maximize a received power level received by the energizable device according to the device response. The received power level is proportional to a transmitted power level of the energy beam formed from a first energy beam including the first EM wave and a second energy beam including the second EM wave.

Alternative embodiments of the system for wireless energy transfer include one of the following features, or any combination thereof. A frequency management module is configured to align the second fundamental frequency to be equal to the first fundamental frequency by using Wireless Injection Locking (WIL). A polarization alignment module is configured to align a first polarity of the first EM wave with a second polarity of the second EM wave. Each of the first energy beam and the second energy beam are narrow angle beams. Each of the first energy beam and the second energy beam further comprise a plurality of frequencies being rationally-related to the first fundamental frequency and the second fundamental frequency respectively. The processing module is configured to receive a Received Signal Strength Indication (RSSI) from the energizable device, and the processing module is configured to adjust one or more of the tracking module, the first beamforming module, the second beamforming module and the phase alignment module to maximize the RSSI value. The processing module is configured to receive a telemetry data from the energizable device. The processing module is configured to communicate with the first beamforming module, a second processing module is configured to communicate with the second beamforming module, and the processing module is configured to communicate with the second processing module.

In another embodiment, a method for wireless energy transfer comprises forming a plurality of energy beams, each energy beam comprising one or more electromagnetic (EM) waves having a same fundamental frequency as a fundamental frequency of another EM wave of another one of the energy beams. A device response of an energizable device to the plurality of energy beams incident thereon is tracked. The one or more EM waves for each of the plurality of energy beams is directed to power the energizable device. A respective phase of the one or more EM waves for at least one of the energy beams is aligned to another phase of another EM wave of another one of the energy beams. A received power level received by the energizable device is maximized according to the device response by optimizing for at least one of the energy beams, the directing of the one or more EM waves and the aligning of the phase of the one or more EM waves.

Alternative embodiments of the method for wireless energy transfer include one of the following features, or any combination thereof. Locking the same fundamental frequency of each EM wave for each energy beam to one another using Wireless Injection Locking (WIL). WIL includes modulating a substrate voltage of a field effect transistor (FET) to alter a bias current of a resonant circuit. Aligning a respective polarity of the one or more EM waves for the at least one of the energy beams to another polarity of the another EM wave of the another one of the energy beams. The device response includes receiving a backscattered EM wave from the energizable device as a Received Signal Strength Indicator (RSSI). Aligning a respective polarity of each of the EM waves for the at least one of the energy beams to the EM waves of another of the energy beams. Receiving from the energizable device a telemetry data to adjust a transmitted power level of each of the energy beams.

In another embodiment, a method for wireless communications comprises forming a plurality of energy beams, each energy beam comprising one or more electromagnetic (EM) waves. A respective fundamental frequency of each of the EM waves for at least one of the energy beams is matched with Wireless Injection Locking (WIL) to a fundamental frequency of the EM waves of another one of the energy beams. A device response for each of a plurality of energizable devices, to the plurality of energy beams incident thereon is tracked. The one or more EM waves for each of the plurality of energy beams is directed to power at least one energizable device. A respective phase of each of the EM waves for the at least one of the energy beams is aligned to another phase of another EM wave of the another one of the energy beams. A received power level received by each of the energizable devices is maximized according to their respective device response by optimizing the aligning of the phase of each of the EM waves for at least one of the energy beams.

Alternative embodiments of the method for wireless communication include one of the following features, or any combination thereof. Receiving, at a power access point, from at least one of the energizable devices a telemetry data, the power access point capable of at least one of tracking of one of the device responses, the forming of one of the plurality of energy beams and the aligning of the phase of each of the EM waves for an at least two of the energy beams. Aligning a respective polarity of the one or more EM waves for the at least one of the energy beams to another polarity of the another EM wave of the another one of the energy beams. The at least one energy beam is directed to more than one of the energizable devices on a time-shared basis. The at least one energy beam is directed to a new energizable device in response to a relocation of one of the plurality of energizable devices.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Embodiments of systems and methods described herein provide for the efficient transfer of energy (e.g. powering) from an energy source to a plurality of energizable devices, including for example, RFID tags, smartphones and game controllers. In one embodiment, multiple energizable devices are powered from a distance of up to five meters by aligning the direction, frequency and phase of electromagnetic (EM) waves within multiple energy beams. In another embodiment, energy is transferred to devices further than five meters. A device is considered to be energizable when it is capable of receiving radiated EM waves to provide energy for device operation. The device need not store the received energy, although in some embodiments the device will store at least a portion of the received energy.

The energy received at each of the energizable devices is optimized by communication between at least one of the energizable devices and one of the energy beam transmitters (e.g. power access points). This efficient transfer of energy enables the realization of an IoT system, where a variety of energizable devices (and/or a plurality of the same type of device) communicate with one another, and remain powered with minimal spatial constraint or limitations on the movement of each device.

Figure 1:
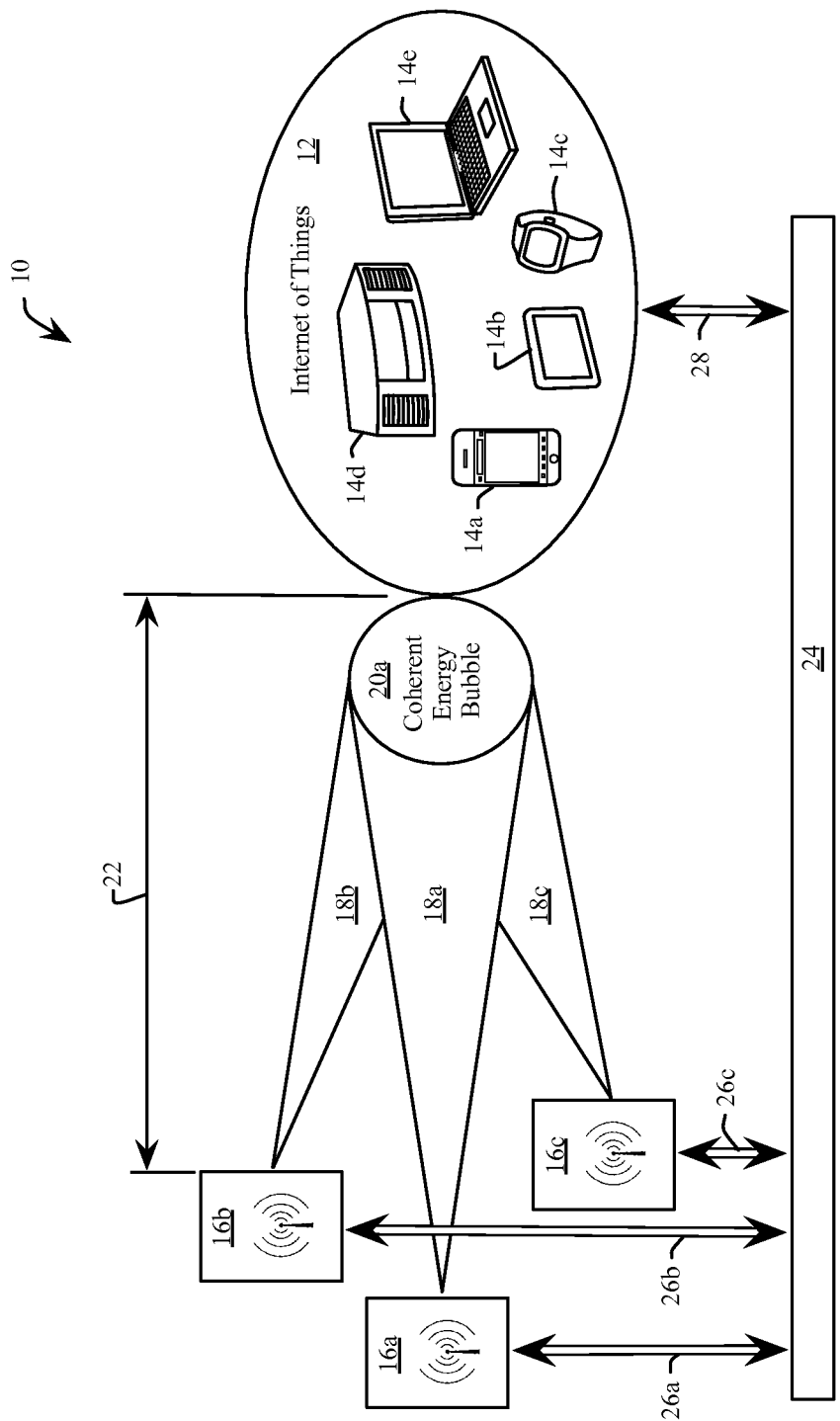
FIG. 1 is schematic view of an embodiment of a system for wireless energy transfer.

Referring to FIG. 1 an embodiment 10 of a system for wireless energy transfer provides energy (e.g. "powers") an IoT 12, including for example a cell phone 14a, a tablet 14b, a smart watch 14c, a stereo 14d and a computer 14e. The energizable devices 14a through 14e (generally 14) are merely illustrative and should not be considered to constrain the potential devices that would comprise the IoT 12. In one example, all of the devices 14 are of the same type. In another example, the devices 14 are low power devices such as RFID tags. In another example, the devices 14 are high power devices, such as motorized wheelchairs. Various embodiments replace the IoT 12 with one or more devices 14 that need not be associated with, nor communicate, with one another.

The devices 14 of the IoT 12 receive energy from a plurality of power access points 16a, 16b and 16c (generally 16). Each power access point 16a, 16b and 16c emits a respective energy beam 18a, 18b and 18c (generally 18), wherein each of the energy beams has at least one EM wave.

Each of the EM waves of at least two energy beams is directed (e.g. focused) at a receiving location of one of the devices 14 to optimize the energy received by the one device. By further aligning both the frequency and the phase of each EM wave of each energy beam focused at the receiving location, a coherent energy bubble 20a is formed. In another embodiment, aligning the frequency, phase and polarity of each EM wave of each energy beam forms the energy bubble 20a. Including the alignment of the polarity further increases the energy in the coherent energy bubble 20a, and thus the received power level for the devices located therein.

In various embodiments, the energy beams are narrow angle beams. The term "narrow angle beams" as used within the context of this disclosure includes pencil beams and fan beams. Pencil beams have a narrow (relative to the beam length) conical or a cylindrical cross section. Fan beams have a narrow width in the azimuth direction and a relatively wider width in the elevation direction.

Aligning a frequency of each EM wave means to align (e.g. cohere) a fundamental frequency of each EM wave to be "equal" to another reference frequency, generated by a master for example. A fundamental frequency is the lowest frequency produced by an oscillation, as distinct from its harmonics. When a fundamental frequency of an EM wave is aligned to be equal to another frequency through a control method or circuit (e.g. WIL), the fundamental frequency is deemed to be "locked." When the fundamental frequency of an EM wave is not locked, it is deemed to be "free-running" In various embodiments, wherein two or more EM waves each comprise a plurality of frequencies rationally related to their respective fundamental frequency, a fundamental frequency that is locked to another master frequency, will effectively lock the fundamental and rationally related frequency components of one EM wave to the respective fundamental and rationally related frequency components of another EM wave.

A frequency, phase or polarity of a fundamental frequency is considered to be "equal" to a respective frequency, phase or polarity of another fundamental frequency when the respective frequency, phase or polarities are "substantially equal" or within a reasonable manufacturing and environmental tolerance or each other. In one non-limiting embodiment, a two percent alignment error in one or more of the respective frequency, phase or polarities due to the combination of manufacturing and environmental tolerances is reasonable.

For clarity of illustration, the coherent energy bubble 20a in FIG. 1 is shown adjacent to the IoT 12 environment, and formed by three energy beams 18. In practice, each coherent energy bubble is formed by at least two energy beams and is focused at a point (e.g. a receiving antenna) on one of the devices 14 to maximize the received power by the one device. In one embodiment, more than one coherent energy bubble is formed, with each coherent energy bubble focused on a different device. In another embodiment, at least one coherent energy bubble is timed-shared between several devices.

The range 22 of the power access points 16 to transmit a sufficient energy level to an energizable device 14 depends in part on the required power that the device 14 needs to receive, the number of energy beams 18 used to form the coherent energy bubble, limitations on the power of each of the energy beams 18 (e.g. due to FCC limitations based on safe operating levels for living organisms), and the absorption characteristics of the transmission medium through which the energy is transmitted. In one embodiment, a range 22 of five meters is achieved using 100 mW of transmit power per energy beam. In other embodiments, the range 22 is greater than five meters by combining additional energy beams 18 to form the coherent energy bubble.

In one embodiment, the energy delivered by each of the energy beams 18 is adjusted by communication through a communication medium 24. The communication medium 24 connects one or more devices 14 in the IoT 12 over a path 28, to one or more of the power access points 16a, 16b and 16c over respective paths 26a, 26b and 26c (generally 26). In various embodiments, the communication medium 24 is a physical structure such as a back plane. In other embodiments, the communication medium is the same medium that is used by the energy beams 18. In one example, the communication medium is air (e.g. a terrestrial environment). In another example, the communication medium is at least a partial vacuum as found in orbital altitudes or outer space. In another example, the communication medium is either fresh or salt water. In another embodiment, the communication medium is roofing material on a house, the power access points collect energy from solar panels on the exterior of the house, and the devices 14 receive the energy through the roofing material for further power distribution within the house.

In various embodiments, each EM wave in each energy beam 18 is aligned to a single fundamental frequency to increase the energy received by each device. In various embodiments, where the communication medium 24 has significant energy absorption characteristics relative to the transmission frequency, more than one frequency is used within each beam, where each frequency within a beam is rationally related to the fundamental frequency.

In various embodiments, the communication between the devices 14 and the power access points 16 is controlled by one or more devices acting as a master, by one or more power access points acting as a master, or in a master-less scenario (for example, an iterative solution is obtained). Communication between the devices 14 and the power access points 16 is used to optimize (e.g. maximize) the transfer of power from the power access points 16 to the devices 14. For example, each of the beams 18 are directed (e.g. steered) towards one or more devices to maximize a received energy level at the respective device as communicated from the respective device to at least one of the power access points 16. Similarly, the phase for each of the energy beams 18 is adjusted by the power access points 16 to maximize the received energy level at the respective device. In some embodiments, the polarity of each of the energy beams 18 is also aligned to maximize the received energy at the respective device. Communication over the paths 26 and 28 and through the medium 24 includes for example, the use of one or more of the IEEE 802.3 Ethernet standards, one or more the IEEE 802.11 WiFi® standards, one or more of the Bluetooth® standards, one or more of the IEEE 802.15.4 ZigBee® standards, a proprietary communication protocol, any wired or wireless communication protocol or any combination of the foregoing.

The advantages of aligning the frequency, phase and direction of the energy beams 18 to power a device are further exemplified with the following example embodiment. This embodiment assumes a room where the average distance of six power access points from a single energizable device is five meters. Without the advantages of the present disclosure, the device will receive a power of "$P_{rx}$" Watts from each power access point. The power received at the device is defined by the following equation wherein "$P_{tx}$" is the transmitted power in Watts, "$G_{tx}$" is the transmitter antenna linear gain, "$G_{rx}$" is the receiver antenna linear gain, "$\lambda$" is the wavelength of the EM waves in meters, and "R" is the distance between the transmitter (e.g. in the power access point) and the receiver (e.g. in the device) in meters:

$$P_{rx}=[P_{tx}*G_{tx}*G_{rx}*\lambda^2]/[4\pi R]^2$$

In this example embodiment, the transmitter antenna provides an azimuthal omnidirectional pattern with vertical nulls (as provided by a single dipole antenna), with a gain of approximately 6 dB. The receive antenna has an omnidirectional pattern in all three physical dimensions with unity gain. The transmitter operates at 2.4 GHz with a wavelength of 0.125 meters, and transmits a power of 0.5 W. This example embodiment thus provides 8 µW of received power at the device from each power access point, or a total power "$P_{total}$" of 48 µW from six non-coherent power access points.

Turning now to a modified embodiment where each of the six power access points are cohered to a single frequency and in-phase arrival at the device the power received at the device is given by the following equation:

$$P_{total}=[(P_{rx1})^{0.5}+(P_{rx2})^{0.5}(P_{rx3})^{0.5}(P_{rx4})^{0.5}+(P_{rx5})^{0.5}+(P_{rx6})^{0.5}]^2$$

The modified embodiment with cohered frequency and phase provide a total power of 288 µW to the device. In another modified embodiment with cohered frequency and phase, where a phased array antenna is used with six elements to direct each energy beam to the device, the total received power is given by the following equation:

$$P_{total}=N^{2}*[(P_{rx1})^{0.5}+(P_{rx2})^{0.5}(P_{rx3})^{0.5}+(P_{rx4})^{0.5}+(P_{rx5})^{0.5}+(P_{rx6})^{0.5}]^2$$

The total received power for the six-element phased array transmitter and cohered frequency and phase at the device is thus 10.36 mW—an improvement of 216 times the power received with an energy beam that is not directed (e.g. omnidirectional), nor cohered in frequency and phase.

Figure 2:
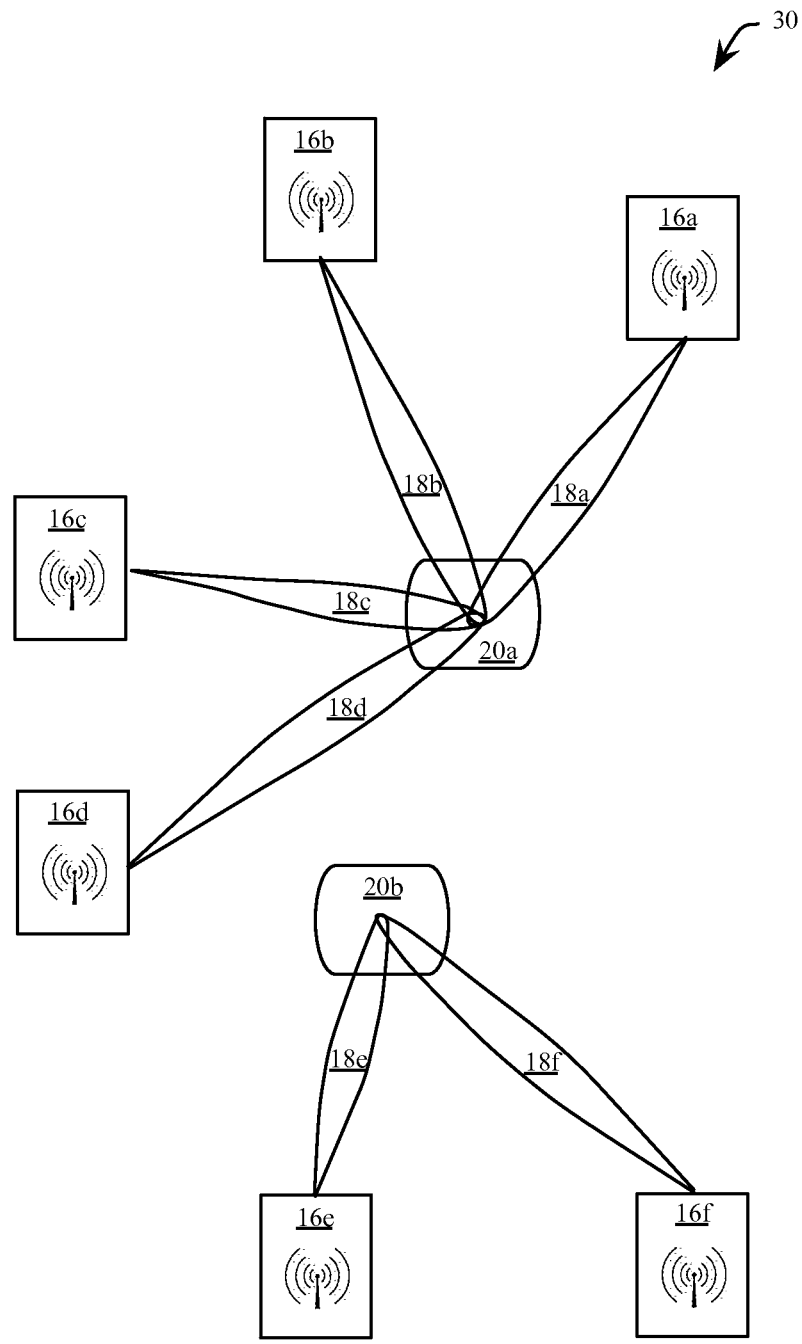
FIG. 2 is a schematic view of a system for wireless energy transfer including a plurality of energizable devices.
Figure 3:
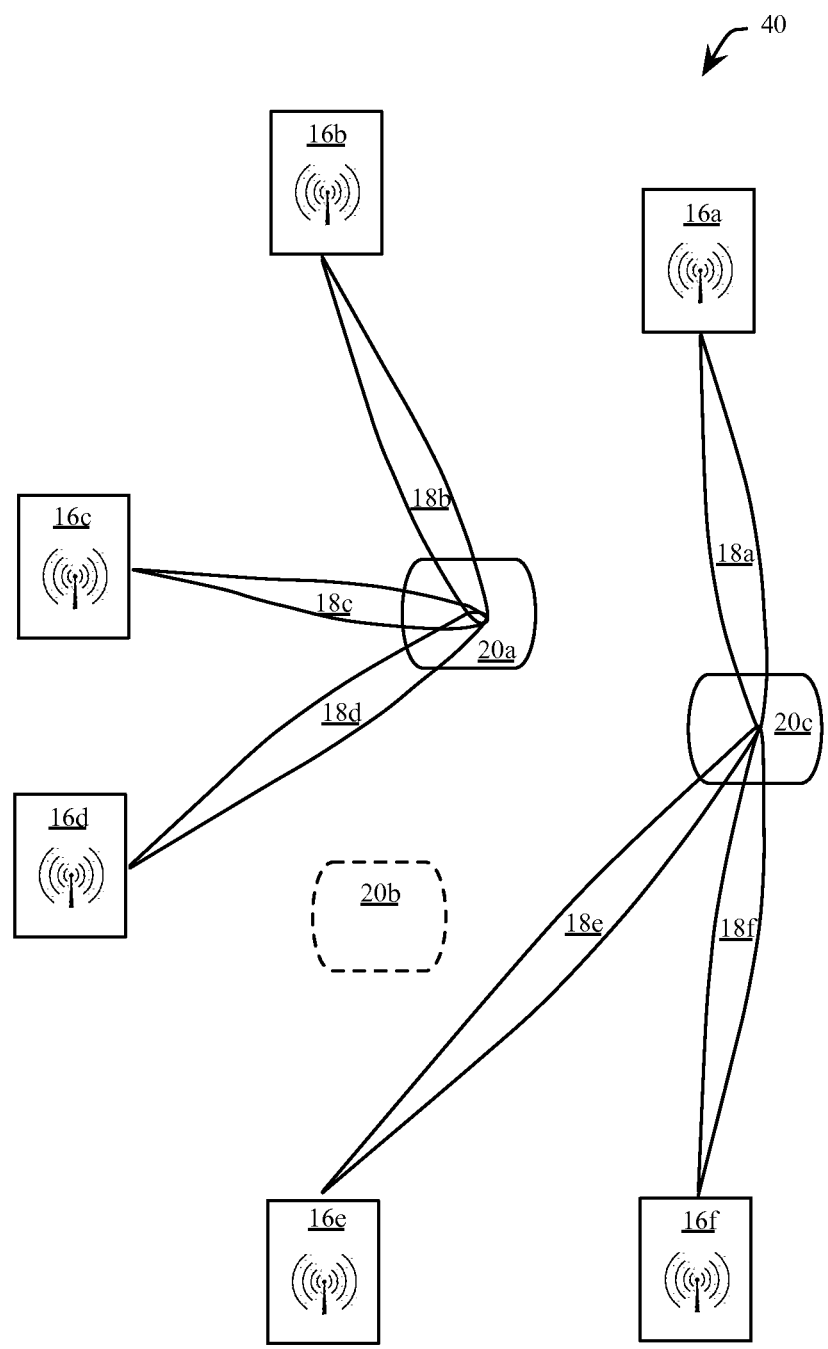
FIG. 3 is a schematic view of the system of FIG. 2 wherein a plurality of energy beams is reconfigured to adapt to a change in the energizable devices.
Figure 4:
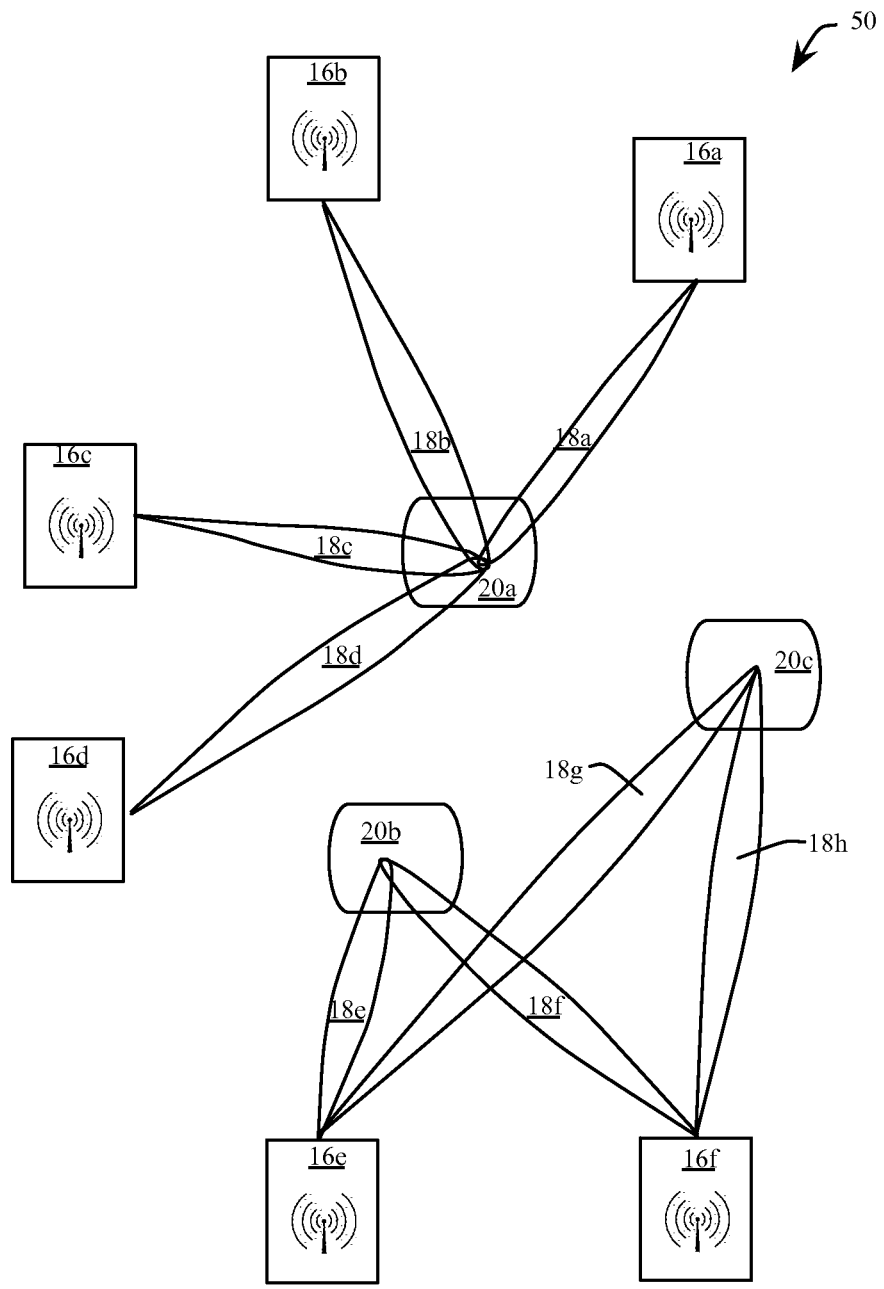
FIG. 4 is a schematic view of the system of FIG. 3 wherein a subset of the energy beams is time-shared between multiple energizable devices.

FIG. 2, FIG. 3 and FIG. 4 show three embodiments wherein energy beams 18 are reconfigured to form coherent energy bubbles that track the changing positions of a plurality of devices. With reference to FIG. 1 and FIG. 2, the embodiment 30 of FIG. 2 includes the three power access points 16a, 16b and 16c of FIG. 1, transmitting respective energy beams 18a, 18b and 18c to form a coherent energy bubble 20a. A fourth power access point 16d transmits a energy beam 18d towards the coherent energy bubble 20a. As with the foregoing description of FIG. 1, the energy bubble 20a is coincident with a receiving antenna of an energizable device. The energy of each energy beam 18a, 18b, 18c and 18d is lower than the energy for each of the same beams 18a, 18b and 18c in FIG. 1 for the same required total energy received at the coherent energy bubble 20a. In one embodiment, the energy of at least one of the energy beams 18a, 18b, 18c and 18d is different from each other energy beam, wherein the same total energy is received at the coherent energy bubble 20a. In another embodiment, the total energy of the energy beams 18a, 18b, 18c and 18d is increased or decreased to match the requirements of the device receiving energy from the coherent energy bubble 20a.

FIG. 2 also shows the position of a second coherent energy bubble 20b formed by power access points 16e and 16f transmitting a respective energy beam 18e and 18f towards the coherent energy bubble 20b. The allocation of the energy beams 18 to form the coherent energy bubbles 20a and 20b is based upon communication between one or more devices 14 and one or more power access points 16. In one embodiment, the respective devices associated with the coherent energy bubbles 20a and 20b communicate their energy requirements to the power access points 16a, which acts as a master. The power access point 16a communicates with the remaining power access points to direct their respective energy beams towards the respective devices associated with the coherent energy beams 20a and 20b. Specifically, energy beam 18d is directed towards the coherent energy bubble 20a, rather than the coherent energy bubble 20b based upon the near term energy requirements of the respective devices, distance to the respective devices, or other factors. In one example where the device associated with the coherent energy bubble 20a includes the capability to store energy, the energy beam 18d will redirect towards the coherent energy bubble 20b when the device associated with the coherent energy bubble 20a is sufficiently charged.

According to various embodiments, one of a subset of the power access points is elected as a master one of the subset of the power access points according to one or more of: an election algorithm, such as a leader election algorithm; a random or pseudo-random choice; a determination as to which one of the subset of the power access points is closest, such as measured by RSSI, to a particular one of the devices; a determination as to which one of the subset of the power access points is closest to a centroid of the subset of the power access points; and other techniques for determining a master. In some embodiments, choosing the master power access point to be the one of the subset of the power access points closest to the particular device decreases a likelihood of determining a need to elect a new one of the power access points as master. In other embodiments, choosing the master power access point to be the one of the subset of the power access points closest to the centroid of the subset of the power access points provides a central location from which to wirelessly transmit a signal that enables the subset of the power access points to use a common fundamental frequency (e.g. to lock the fundamental frequency).

In some embodiments wherein a first subset of the power access points is enabled to power a respective first one of the devices, and a second subset of the power access points is enabled to power a respective second one of the devices, each of the first subset of the power access points and the second subset of the power access points elects a respective master power access point. A master power access point will transmit a signal to the other power access points (e.g. slaves) within the respective subset, to lock a fundamental frequency of each of the slave power access points to a frequency of the master power access point. In so doing, each power access point within a subset operates with a locked fundamental frequency that is cohered to one another. In some embodiments, the first subset of the power access points and the second subset of the power access points operate independently, including using a respective locked fundamental frequency. In other embodiments, all of the power access points are configured to operate at a single locked fundamental frequency by electing a single master power access point.

In some embodiments wherein the first subset of the power access points and the second subset of the power access points operate using a respective locked fundamental frequency, each of the locked fundamental frequencies are in a same frequency band, for example one of the Industrial, Scientific and Medical (ISM) bands. In further embodiments, the respective locked fundamental frequency of the first subset of the power access points and the respective locked fundamental frequency of the second subset of the power access points are selectively in different portions, such as different ones of a plurality of channels, of the band.

In various embodiments wherein the first subset of the power access points and the second subset of the power access points operate using respective locked fundamental frequencies, the respective locked fundamental frequency of the first subset of the power access points and the respective locked fundamental frequency of the second subset of the power access points are in different bands, such as in different ones of the ISM bands.

In some embodiments wherein the first subset of the power access points and the second subset of the power access points operate using respective locked fundamental frequencies, the respective locked fundamental frequency of the first subset of the power access points and the respective locked fundamental frequency of the second subset of the power access points are selectively chosen to minimize interference in the powering of the respective devices, such as by maximizing an average RSSI of the respective devices.

Turning now to FIG. 3 an embodiment 40 is shown wherein the device associated with the coherent energy bubble 20b is relocated, with a corresponding relocation of the coherent energy bubble shown as 20c. In another embodiment, the coherent energy bubble 20b is associated with a deactivated device (or a device that is in sleep mode and thus not requiring further power), and the coherent energy bubble 20c corresponds to a newly activated device. Continuing with the example communication protocol of embodiment 30 in FIG. 2, wherein the power access point 16a is a master, the device associated with the coherent energy bubble 20c communicates to the power access point 16a, which then redirects energy beam 18a. The power access point 16a also communicates with the power access points 16e and 16f to redirect the respective energy beams 18e and 18f, thus forming the coherent energy bubble 20c. In one example, the power access point 16a also communicates with at least one of the power access points 16b, 16c and 16d to increase their respective transmitted energy such that the total power at the coherent energy bubble 20a is not changed by the redirection of the energy beam 18a.

FIG. 4 shows an embodiment 50, wherein the devices associated with the coherent energy bubbles 20b and 20c both require energy to be received. In the embodiment 50 there are an insufficient number of power access points for the number and energy demands of the various devices requiring energy. The device associated with the coherent energy bubble 20a requires four energy beams in this example. Accordingly, the power access points 16e and 16f share their energy beams in a time shared manner to form the coherent energy bubble 20b with energy beams 18e and 18f, and to form the coherent energy bubble 20c with energy beams 18g and 18h. The percentage of time that the energy beams are shared between the coherent energy bubbles 20b and 20c is adjusted to, for example, satisfy the energy requirements of the respective devices, or to balance the charging rate of the respective devices.

In some embodiments, each of the power access points is enabled to operate in a respective power mode. According to various embodiments, the respective power modes comprise one or more of: off; sleep; standby; active; and other power modes. The following is an example description of an embodiment of operations or behaviors of the respective power modes. When the respective power mode of one of the power access points is off, the power access point is not active and does not operate.

When the respective power mode of one of the power access points is sleep, the power access point is using a smallest amount of power. A power amplifier of the respective power-transmitting circuitry of the power access point is kept in a barely on state, such as at a pedestal to avoid interference to other wireless devices during wake up (e.g. spectrum regrowth). The power access point periodically listens for activity, for example on a communication interface such as Bluetooth, and is able to transition to a higher-power one of the respective power modes if a need for communication with others of the power access points or with a device is determined.

When the respective power mode of one of the power access points is standby, the power access point is using a larger amount of power than if the respective power mode of the power access point is sleep. The power amplifier of the power access point is, in some embodiments and/or usage scenarios, kept on at a greatly reduced power level, such as less than five percent of normal power. In other embodiments or usage scenarios, the power amplifier of the power access point is placed in the barely on state if, after a determined time interval, the power amplifier is not needed. In further embodiments or usage scenarios, one or more other communication interfaces of the power access point are turned off or operated periodically if, after a determined time interval, the other communication interfaces are not needed. In various embodiments or usage scenarios, the power access point is able to transition to a higher-power one of the respective power modes if, for example, a need to wirelessly provide power is determined, or, after a determined period of time, to a lower-power one of the respective power modes if, for example, it is determined that there is no need to wirelessly provide power.

When the respective power mode of one of the power access points is active, the power access point is fully operational. The power access point is able to transition to a lower-power one of the respective power modes if, for example, it is determined for a specified period of time that there is no need to wirelessly provide power.

Many variations of operation or behavior of the power access points in different ones of the respective power modes, as well as a number of the respective power modes, are contemplated. In a first example embodiment or usage scenario, the power amplifier of the power access point is turned off, either altogether or periodically, in the respective sleep mode. In a second example embodiment, there are only three respective power modes: off, sleep, and active.

Figure 5:
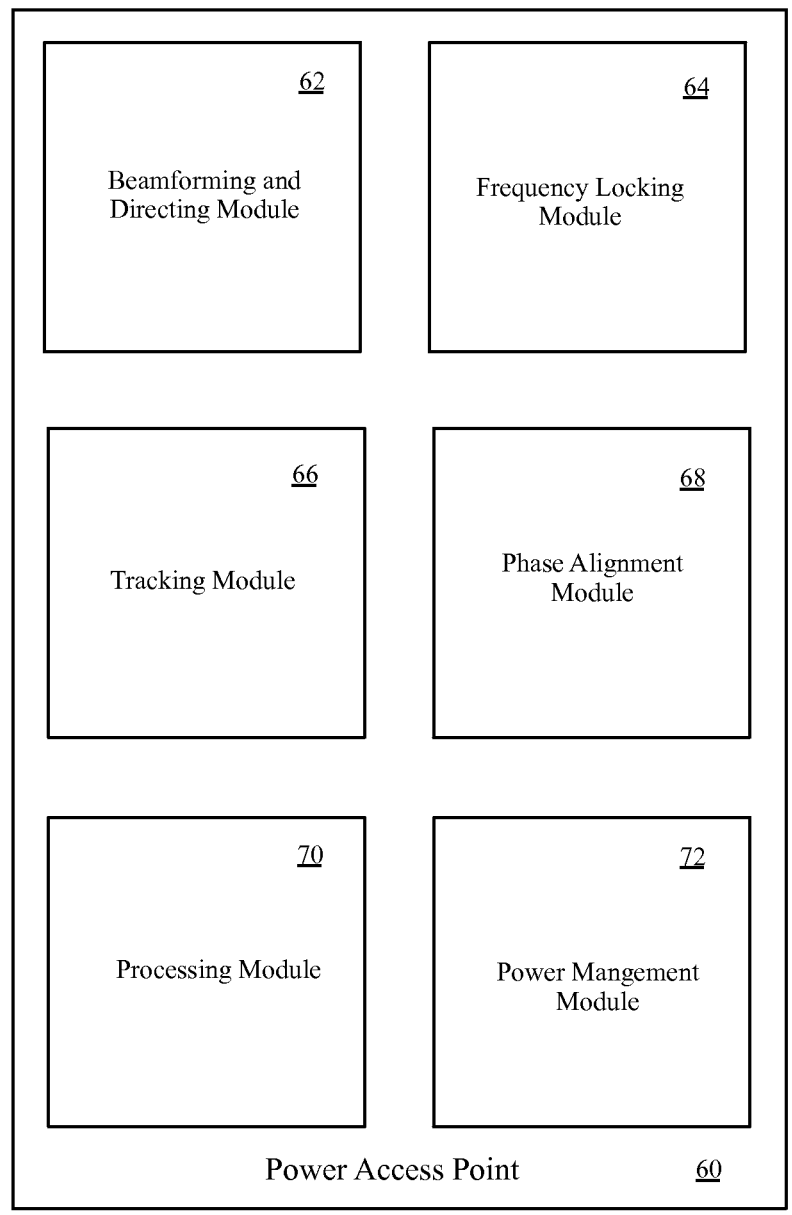
FIG. 5 is functional block diagram of a power access point.

FIG. 5 shows the functional blocks of a power access point 60 according to an example embodiment. The power access point 60 includes a beamforming and directing module 62, a frequency locking module 64, a tracking module 66, a phase alignment module 68, a processing module 70 and a power management module 72. Various embodiments implement one or more of the functional blocks shown in FIG. 5 in hardware, software or a combination of hardware and software. In other embodiments, two or more of the functional blocks of FIG. 5 share hardware or software resource to implement their respective functions.

In some embodiments, the beamforming and directing module 62 includes a phased array antenna with at least eight antenna elements, or a switched beam antenna, or another type of antenna. Each antenna element has an adjustable phase delay to allow the beam formed by the collective emissions of all antenna elements to be formed, and directed towards a device.

The frequency locking module 64 aligns the frequencies of each of the EM waves (corresponding to an antenna element) of each the formed beams to within a reasonable tolerance relative to manufacturing and environmental errors. In one example, a two percent tolerance is reasonable, however tolerances that are greater or less than two percent are still realizable while maintaining the benefits taught by this disclosure over a non-cohered system. In various embodiments, injection locking (e.g. wired or wireless) is used to align the frequencies of the EM waves within and between each energy beam.

The tracking module determines a location of one or more of the energizable devices to assist the beamforming and directing module 62 with steering each of the energy beams towards a device (or multiple devices by time sharing as shown in FIG. 4). In various embodiments, obtaining the location of an energizable device includes scanning an energy beam from the beamforming and directing module 62 and finding a scan direction where the energy received by the device is maximized. In other embodiments, obtaining the location of the energizable device includes using a compass, or a GPS signal, or other techniques.

The phase alignment module 68 aligns the phase of each EM wave from each power beam emitted by the beamforming and directing module 62. In various embodiments, the phase alignment module 68 uses the same phase delay elements of the beamforming and directing module 62. While the beamforming and directing module 62 shapes an energy beam into a narrow beam and directs the energy beam towards a device, the phase alignment module 68 enables the phase alignment of multiple power access points, such as by compensating for phase errors due in part to multi-path propagation, distortion from the transmission medium between the power access points and device, doppler errors introduced by the movement of the device or time-of-flight errors.

The processing module 70 communicates with other power access points and with one or more energizable devices to maximize the energy received by the devices. In various embodiments, the processing module 70 will act as a master and communicate with other power access points to coordinate the delivery of energy to one or more devices. In other embodiments, the processing module 70 acts as a slave and receives communication from other power access points to control the various aforementioned functions of the power access point 60. In another embodiment, the processing module 70 communicates and interacts with other power access points in a masterless mode (e.g. by priority voting or by iterating upon a solution). For some embodiments, where the processing module 70 is a master, the processing module receives a Received Signal Strength Indicator (RSSI) from a device, compares the RSSI against a previously received RSSI from the device, and adjusts one or more of the beam direction with one of the beamforming and directing module 62 and tracking module 66, and the phase of at least one EM wave in an energy beam with one of the beamforming and directing module 62 and the phase alignment module 68. In other embodiments, a polarity of each EM wave for each energy beam is also aligned to be the same as a polarity of other EM waves, based on an RSSI level received by the device.

A power management module 72 is used to condition power from a power source for use by the other functions of the power access point 60. In one embodiment, the power conditioning includes at least one of rectifying, boosting (e.g. increasing a voltage or current) or bucking (e.g. reducing a voltage or current) a power source to provide one or more power sources for the power access point 60. In various embodiments, the power source is one of a line power from an electrical outlet in a building, an output of a generator, a solar panel output, and a battery. Other power sources are envisioned within the scope and spirit of this disclosure.

Figure 6:
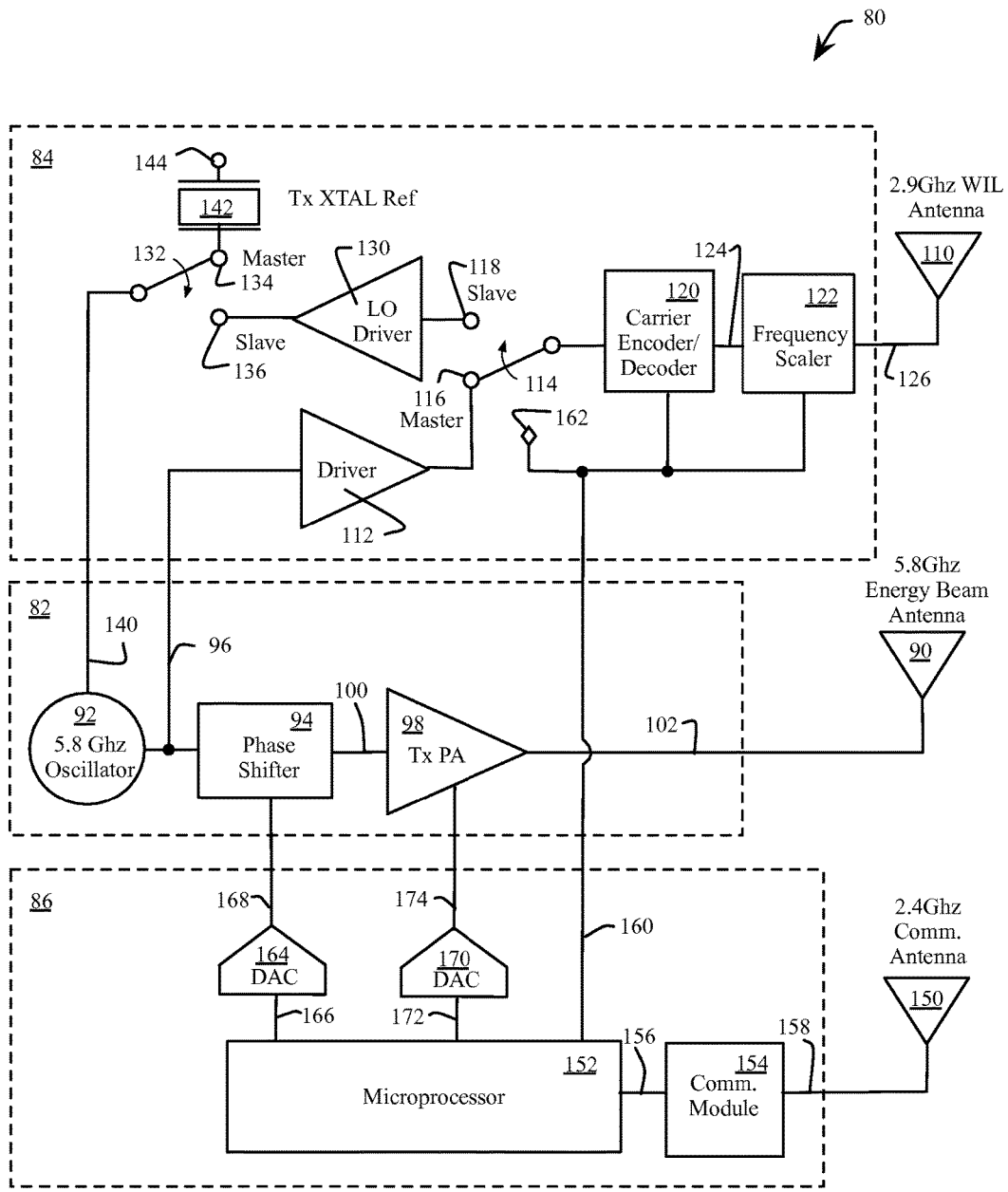
FIG. 6 is a schematic view of a power access point.

FIG. 6 shows further details of an example embodiment 80 of a power access point. The embodiment 80 includes an energy beam section 82, a Wireless Injection Locking (WIL) section 84 and a communications section 86. Referring to FIG. 5 and FIG. 6, the WIL section 84 implements the frequency locking module 64. The energy beam section 82 implements the beamforming and directing module 62, and the phase alignment module 68. The communication section 86 implements the tracking module 66 and the processing module 70. In other embodiments, the functional blocks of FIG. 5 are grouped into different sections from those shown in FIG. 6 without departing from the spirit and scope of this disclosure. For example, in one embodiment, the tracking module 66 is integrated with the energy beam section 82.

Referring to FIG. 6, the energy beam section 82 transmits an energy beam with an energy beam antenna 90. In one example, the energy beam has a fundamental frequency of 5.8 GHz, centered in one of the ISM radio bands. In various embodiments the fundamental frequency is centered in one other ISM band (e.g. 915 MHz, 2.45 GHz, 24.125 GHz and 61.25 GHz). In various embodiments, an exponential moving average of the RSSI received from the device is used to detect interference and the fundamental frequency is changed to another ISM band in response to the interference. For example, a short-term effect such as a person walking through a room would only represent short-term interference. However, a moved filing cabinet would be cause interference over a sufficient duration to necessitate changing the fundamental frequency to another ISM band.

The energy beam section 82 includes an oscillator 92 (e.g. a 5.8 GHz oscillator) connected to a phase shifter 94 by a connection 96. The phase shifter 94 adjusts the phase of an EM wave generated by the oscillator 92 to achieve phase coherence with other EM waves arriving at an energizable device. The phase shifter 94 connects to a transmit power amplifier (PA) 98 by a connection 100. The transmit PA connects to the energy beam antenna 90 by a connection 102. The transmit PA amplifies the EM wave from the phase shifter 94. In some embodiments, the transmit PA is preceded by a preamplifier, which preconditions the EM wave from the phase shifter 94. In one example, the preamplifier preconditions the EM wave (e.g. with an inverse of the distortion) from the phase shifter 94 to null out a distortion introduced by the transmit PA 98.

In some embodiments, the energy beam formed by the energy beam section includes one EM wave. In other embodiments, having a phased array antenna, the energy beam is formed by a plurality of EM waves, wherein each EM wave is conditioned by a respective one of a plurality of phase shifters 94, a respective one of a plurality of transmit power amplifiers 98, and a respective one of a plurality of energy beam antennae 90. Each of the plurality of EM waves shares a single oscillator 92, WIL section 84 and communication section 86.

For example, for an embodiment having an eight-element phased array antenna, the output 96 of the oscillator 92 provides the same EM wave to eight phase shifters 94. The outputs 100 of each of the eight phase shifters 94 are amplified by a respective transmit PA 98 and then radiated by a respective energy beam antenna 90. By adjusting the relative phase of each of the eight EM waves, the eight EM waves radiated by their respective energy beam antennae 90 form a narrow energy beam that can be steered towards a device. The phase of each of the eight EM waves is further modified by the same eight respective phase shifters 94 to ensure phase coherence of the eight EM waves forming the single energy beam, with other EM waves included in other energy beams incident on the device. In various embodiments, the energy beam direction is determined by sweeping a direction of the energy beam in a circle at a fixed angular rate, while receiving an RSSI from the device to determine the optimal beam direction to maximize the RSSI.

The WIL section 84 aligns the fundamental frequencies of each of the EM waves in each energy beam to have the same frequency (e.g. within a manufacturing and environmental tolerance). The WIL section 84 operates in either a master mode or a slave mode for the purpose of aligning (e.g. locking) the frequency of each EM wave with another EM wave. The WIL section 84 operates in a master mode or slave mode to perform frequency alignment, independent from whether the communication section operates as a master or slave for communicating with power access points and devices. The power access point is deemed to operate in the same mode (e.g. master or slave) as the mode of the communication section 86.

When the WIL section 84 operates as a master, the oscillator 92 provides a reference clock, which is transmitted by the WIL antenna 110 to other power access points. Specifically, the output 96 of the oscillator 92 is buffered and driven by a driver 112. A mode switch 114 connects the output of the driver 112 to a master terminal 116 which connects to a carrier encoder/decoder 120, operating in an encoder mode. The output 124 of the carrier encoder/decoder 120 connects to a frequency scaler 122, whose output 126 drives the WIL antenna 110.

In one embodiment, the carrier encoder/decoder 120 transfers a signal from its input 116 to its output 124 without alteration, when the WIL section 84 is operating as a master (e.g. in the master mode). In another embodiment, the carrier encoder/decoder 120 encodes a pseudo-random (PN) sequence when the WIL section 84 is operating as a master. In one example, the PN sequence is used as a synchronization header to encode and decode a clock sequence for secure frequency locking.

When the WIL section 84 is operating as a master, the frequency scaler 122 decreases the fundamental frequency from the oscillator 92 to provide a reference clock frequency to the WIL antenna that does not interfere with the frequency for the energy beam. In the embodiment 80 the oscillator 92 provides a fundamental frequency, which is scaled by 0.5 to create a 2.9 GHz reference clock frequency. Prior to all of the power access points being frequency locked, the spectrum near to the fundamental frequency will be noisy, hence it is desirable to frequency scale the fundamental frequency from the oscillator 92 to generate a reliable reference clock frequency for frequency locking with other power access points. In other embodiments, the oscillator 92 operates at a frequency appropriate for WIL (e.g. 2.9 GHz) and the energy beam section 82 scales the oscillator frequency to generate an appropriate frequency for the energy beam (e.g. 5.8 GHz).

Continuing the example embodiment, when the WIL section 84 operates as a slave, the 2.9 GHz reference clock is received at the WIL antenna 110, and scaled up by the frequency scaler 122 to generate a fundamental frequency equal to the fundamental frequency of the power access point operating in the master mode. In one embodiment, the carrier encoder/decoder 120, operating in the slave mode, generates an injection locked frequency at terminal 118 using the output 124 of the frequency scaler 122 as an injection locked signal. In another embodiment, the carrier encoder/decoder 120 first decodes a PN sequence from the output 124 of the frequency scaler 122, and then generates an injection locked frequency at terminal 118. The generated (or decoded) fundamental frequency is buffered and driven by a local oscillator (LO) driver 130.

When the WIL section 84 operates in the master mode, the mode switch 132 connects a transmit crystal reference 142, which is connected to a bias level 144, to the oscillator input 140. In one embodiment, the oscillator 92, generates a fundamental frequency at a frequency determined by the transmit crystal reference. In other embodiments, the transmit crystal reference is replaced by other sources that provide a frequency reference (e.g. a voltage-controlled oscillator, a current-controlled oscillator, a phase-locked loop, clock division circuitry, or clock multiplication circuitry). When the WIL section 84 operates in the slave mode, the LO driver 130 drives the generated (or decoded) fundamental frequency to the input 140 of the oscillator 92. In one embodiment, the oscillator 92 will pass the fundamental frequency from the input 140 to the output 96 without alteration, when the WIL section 84 operates in the slave mode.

The communication section 86 receives a communication from another power access point or device on the communication antenna 150 when operating in the slave mode. The communication section 86 transmits a communication to another power access point or device on the communication antenna 150 when operating in the master mode. In either the master mode or the slave mode, the communication section 86 transmits or receives information to or from other power access points as part of a communication protocol. In various embodiments, a microprocessor 152 is connected to a communication module 154 by a connection 156, and the communication module 154 is connected to the communication antenna 150 by a connection 158. In various embodiments, the microprocessor 152 controls each of the functional modules shown in FIG. 5 for one of the power access points and either directs, or receives direction from, at least one other power access point or device. In another embodiment, the communication module 154 transmits and receives communication data either on the same energy beam antenna 90 used to transmit an energy beam, on the WIL antenna 110 used for injection locking or on both the energy beam antenna 90 and the WIL antenna 110.

The operation of the microprocessor 152 will now be described with the embodiment 80 of a power access point operating in the master mode. The microprocessor 152 receives an RSSI from a device indicating the received power at the device. In one example, the RSSI is received at the communication antenna 150 as a Bluetooth signal and converted by the communication module 154 to a signal for the microprocessor 152. The microprocessor 152 compares the received RSSI level to a previously received RSSI level and communicates to other power access points to adjust at least one of a phase or beam direction to maximize the received RSSI level. The device communicates a new RSSI level to the power access point 80 by at least one of a polled, interrupt or continuous basis. The microprocessor 152 controls with connection 160, the operation of the WIL section 84 in either master or slave mode with terminal 162. Terminal 162 controls both the mode switch 114 and the mode switch 132 (with only instance of the terminal 162 show in FIG. 6 for clarity). The microprocessor 152 also controls with connection 160 the carrier encoder/decoder 120 to either encode or decode, and the protocol to be used for encoding or decoding. The microprocessor 152 also controls with connection 160 the scaling factor to be used by the frequency (e.g. 2/3 or 3/2 when the WIL section 84 is operating as a master or slave respectively). The microprocessor 152 controls a Digital to Analog Converter (DAC) 164 with connection 166 to adjust the phase of the phase shifter 94 with connection 168, and an DAC 170 with connection 172 to adjust the amplification of the transmit PA 98 with connection 174. In various embodiments, the microprocessor 152 controls other functions and elements including but not limited to thermal sensors, status indicators, circuitry to adjust the polarity of an energy beam to be the same as the polarity of another energy beam incident on a device, and telemetry data transmitted to or received from a device.

Figure 7:
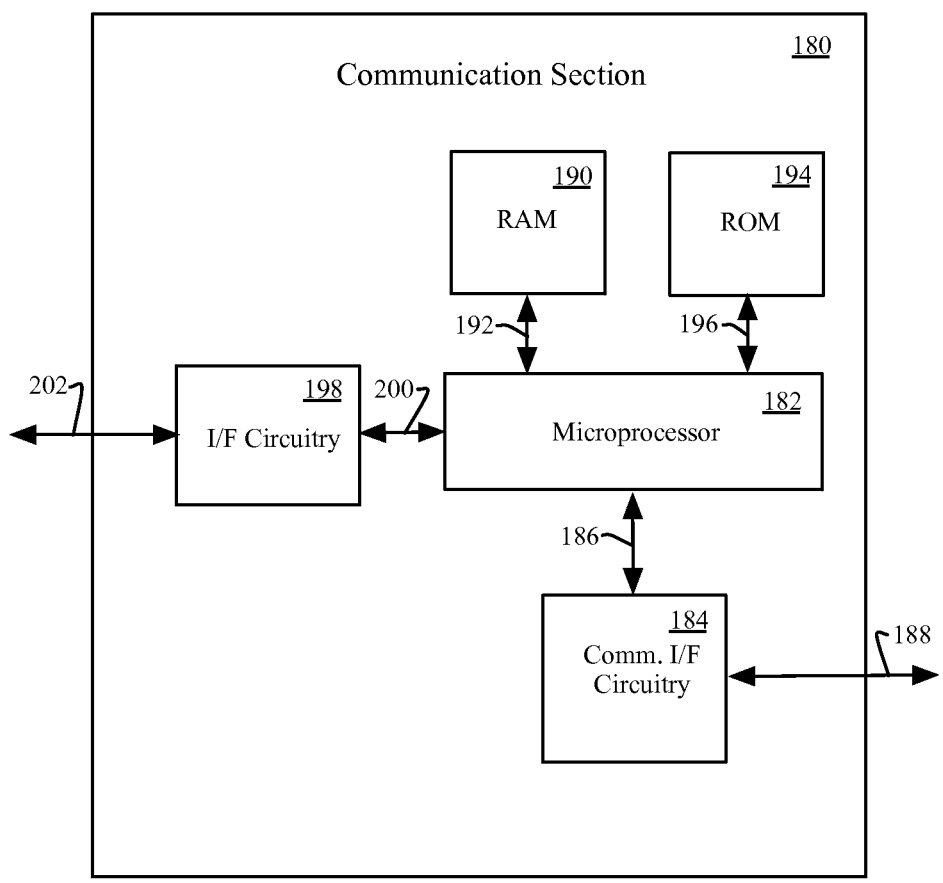
FIG. 7 is a schematic view of a communication section of a power access point.

FIG. 7 shows another embodiment of a communication section 180. The communication section 180 includes a microprocessor 182 for controlling the various functions of the power access point and for communicating with other power access points and at least one device. The microprocessor 182 communicates with communication interface (I/F) circuitry 184 over a connection 186. In one embodiment, the communication I/F circuitry 184 provides Bluetooth communication with an antenna over a connection 188. Other communication protocols are envisioned with the scope of this disclosure. The microprocessor 182 communicates with a Random Access Memory (RAM) 190 over a connection 192, and with a Read Only Memory (ROM) 194 over a connection 196. The RAM 190 and the ROM 194 are enabled to store a combination of data and program code. The microprocessor further communicates with I/F circuitry 198 over a connection 200. In one embodiment, the I/F circuitry 198 is a DAC, which controls a phase shifter over a connection 202.

Figure 8:
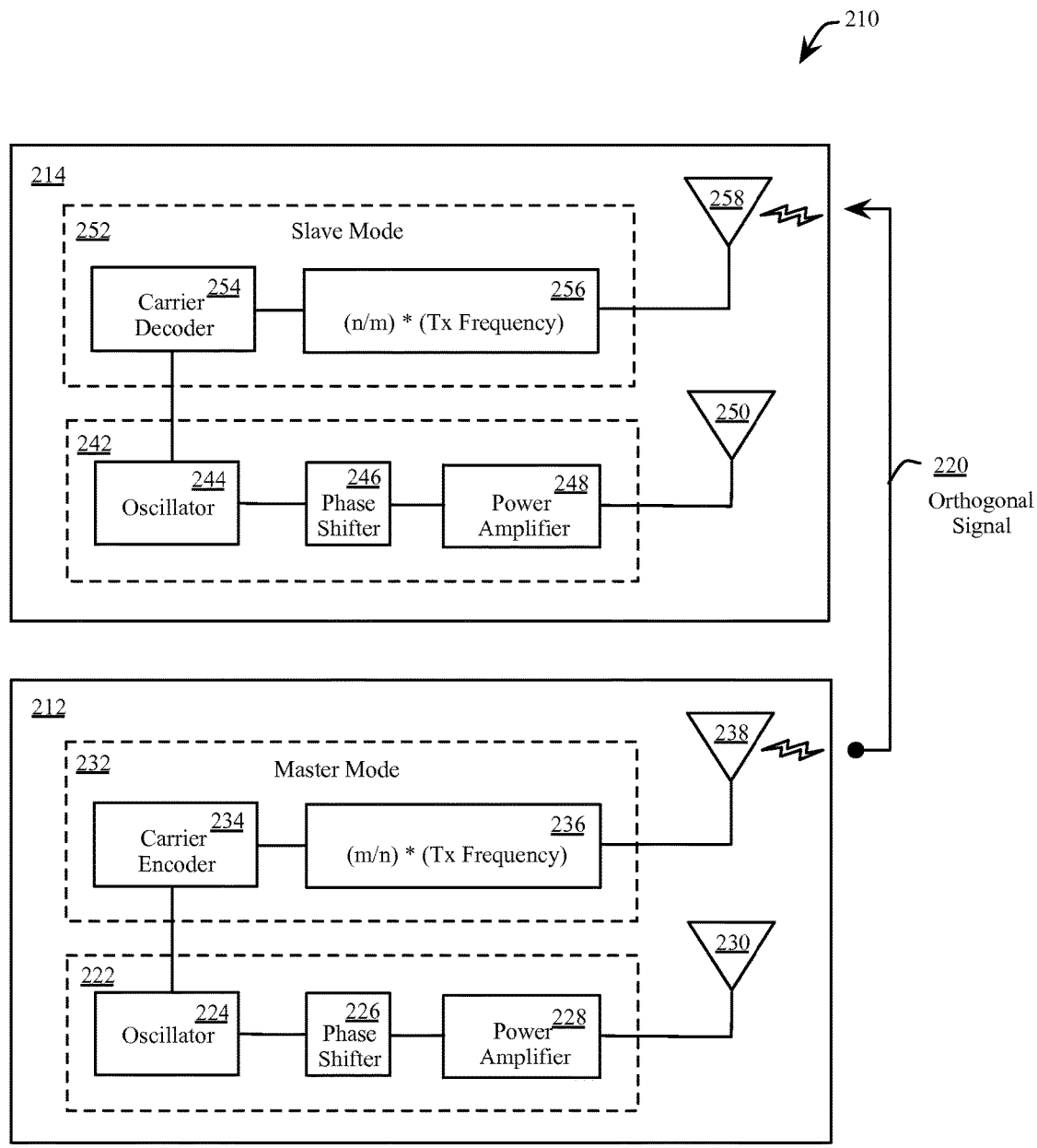
FIG. 8 is a schematic view of a pair of power access points communicating an orthogonal signal for wireless injection locking.

FIG. 8 shows a system 210 for wireless energy transfer having two power access points communicating with each other to perform wireless injection locking. In other embodiments, one power access point is a master, and more than one other power access point is a slave. The operation described for the embodiment 210 is extended to a system with multiple power access points operating as slaves, by broadcasting an orthogonal signal 220 from the master to each of the slaves. In another embodiment the orthogonal signal 220 is replaced by a wired connection between the master and each slave.

Referring to FIG. 6 and FIG. 8, the system 210 includes a power access point 212 with a WIL section operating in a master mode, and a power access point 214 with a WIL section operating in a slave mode. The power access point 212 communicates an orthogonal signal 220 to the power access point 214 to cause the power access point 214 to have the same fundamental frequency as the power access point 212 by using the WIL method. For example, the fundamental frequency of the power access point 214 is locked to the fundamental frequency of the power access point 212. The term "orthogonal signal" in this context is a signal that will not interfere with the energy beam.

The power access point 212 includes an energy beam section 222, which includes an oscillator 224 driving a phase shifter 226. The phase shifter 226 drives a power amplifier 228. The power amplifier 228 drives an energy beam antenna 230. The power access point 212 further includes a WIL section 232 operating in the master mode, and includes a carrier encoder 234 driven by the oscillator 224. The carrier encoder 234 encodes a PN sequence, or another deterministic sequence, in one embodiment based on a clock from the oscillator 224. In another embodiment, the carrier encoder 234 passes through a clock from the oscillator 224. The carrier encoder 234 drives a frequency scaler 236, which transmits the orthogonal signal 220 from antenna 238. The frequency scaler 236 scales the frequency from the oscillator by a factor of "m" divided by "n". In one example the factor of m/n is equal to 3/2.

The power access point 214 includes an energy beam section 242, which includes an oscillator 244 driving a phase shifter 246. The phase shifter 246 drives a power amplifier 248. The power amplifier 248 drives an energy beam antenna 250. The power access point 214 further includes a WIL section 252 operating in the slave mode, and includes a carrier decoder 254, which drives the oscillator 244 with a decoded clock, derived from WIL as described in FIG. 6. The carrier decoder 254 decodes a PN sequence in one embodiment received from a frequency scaler 256. In another embodiment, the carrier decoder 254 generates an injection locked clock at a frequency determined by the output of the frequency scaler 256. The frequency scaler 256 scales a frequency of the orthogonal signal 220 received by the WIL antenna 258, by a factor of "n" divided by "m". In one example the factor of n/m is equal to 2/3.

Figure 9:
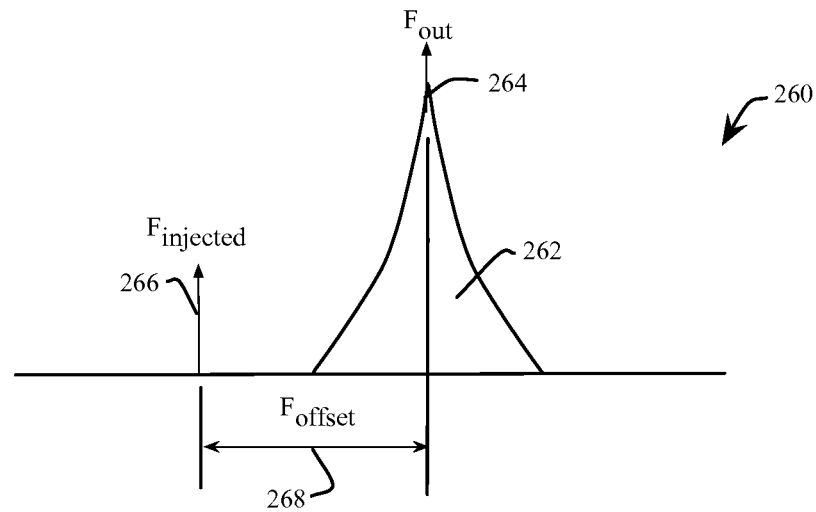
FIG. 9 is a graphical view of a fundamental frequency offset from an injection locked frequency.

FIG. 9 shows a plot of an embodiment 260 having a free-running fundamental frequency spectrum 262 with a free-running fundamental frequency 264. The free-running fundamental frequency 264 is offset from a desired injection locked frequency 266 by a frequency offset 268. In one example, the desired injection locked frequency 266 is the output 118 of the carrier encoder/decoder 120 of FIG. 6 while operating in the slave mode. The use of WIL enables a stable, high-frequency locking with low power consumption. An amount of energy needed to perform injection locking is proportional to the frequency offset 268, hence it is desirable to perform injection locking after the frequency scaler 122 of FIG. 6 has scaled the received frequency at the WIL antenna 110 to a frequency that is closer to the fundamental frequency of the power access point operating as a master. Typically, an amplitude of the injection locked frequency 266 is several orders of magnitude larger than an amplitude of the received fundamental frequency 264.

Figure 10:
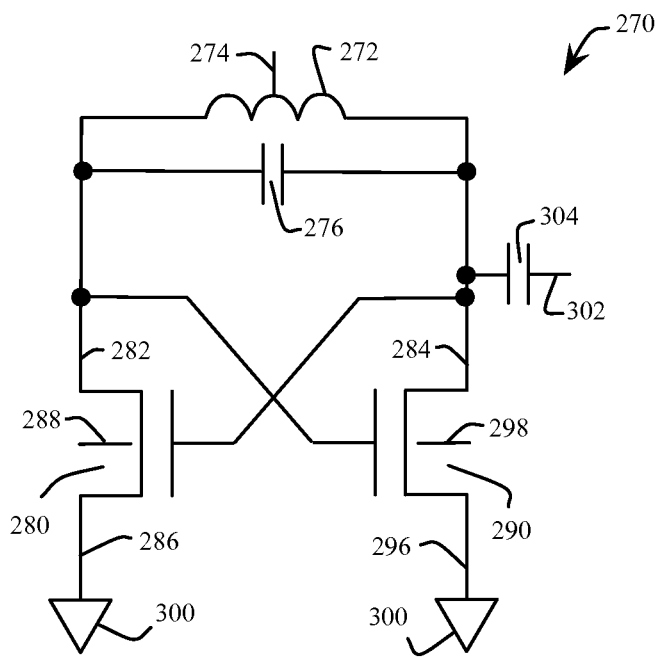
FIG. 10 is a schematic view of a circuit for wireless injection locking.

FIG. 10 shows an example embodiment 270 of a WIL circuit for performing the injection locking shown in FIG. 9. The embodiment 270 includes a resonant LC tank circuit formed with an inductor 272 having a bias tap 274. The inductor 272 is connected in parallel with a capacitor 276. The values of the inductor 272 and the capacitor 276 are chosen so that the embodiment 270 will resonate at a frequency close to the desired injection locked frequency. The embodiment 270 further includes a first transistor 280 having a drain 282, a gate 284, a source 286 and a body connection 288. A second transistor 290 is cross-coupled to the first transistor 280. The second transistor 290 has a drain 284, a gate 282, a source 296 and a body connection 298. The source 286 of the first transistor 280 and the source 296 of the second transistor 290 are each connected to a ground potential 300. In one embodiment the received fundamental frequency 264 as received by the carrier encoder/decoder 120 of FIG. 6 is applied to the body connection 298, causing the second transistor 290 to turn off and the first transistor 280 to turn on. The output 302 is coupled to the drain 284 of the second transistor through a capacitor 304, resulting in an injection locked clock at the output 302 with a frequency locked to the received fundamental frequency, which is substantially the same as the fundamental frequency of the power access point in master mode.

Other circuits and methods to perform WIL, or to lock the respective fundamental frequency of at least two power access points, are envisioned without departing from the scope and spirit of this disclosure. For example, the oscillator 92 (FIG. 6) is implemented in the digital domain in one embodiment, and in the analog domain in another embodiment. In some embodiments, WIL is used to lock a frequency of at least two EM waves. In another embodiment, WIL is used to lock a phase of at least two EM waves. In another embodiment, WIL is used to lock both a frequency and a phase of at least two EM waves. In various embodiments, WIL performs injection locking of a GaN oscillator using a high-Q crystal source, (e.g. having a Quality factor greater than 10,000). In other embodiments, the fundamental frequency of each power access point is locked with a Phase-Locked Loop (PLL), wherein the PLL shares a common reference clock, such as a clock derived from and optionally transmitted wirelessly from, the master power access point.

Figure 11:
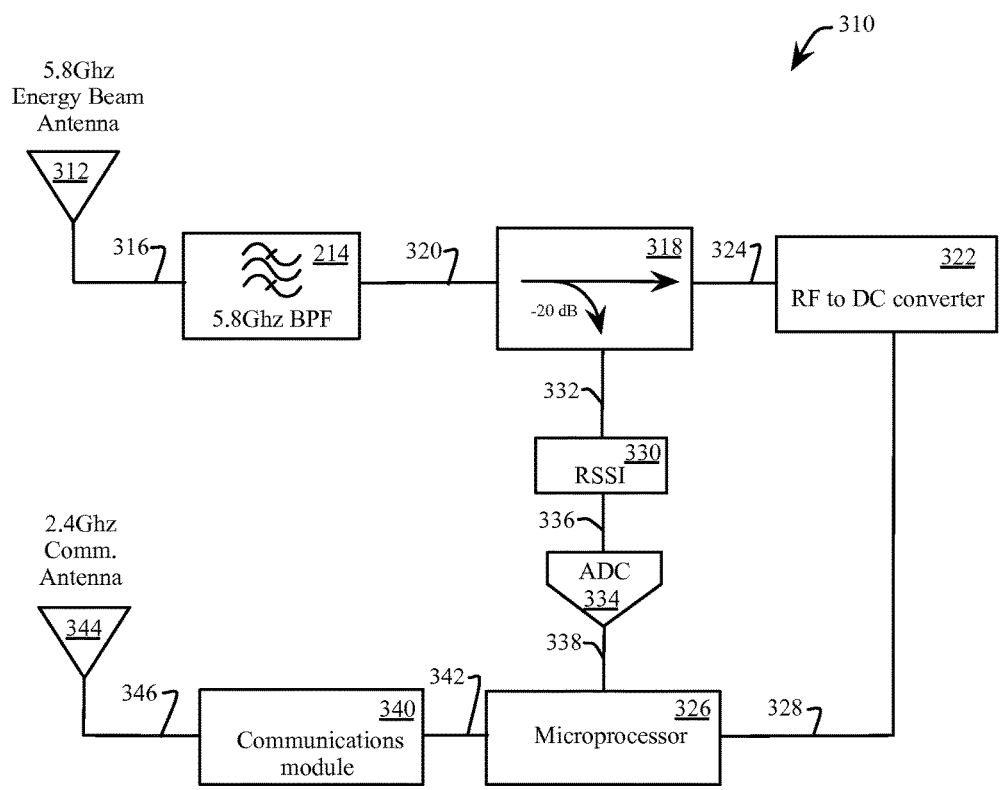
FIG. 11 is a schematic view of an energizable device.

FIG. 11 shows an example embodiment 310 of an energizable device configured to receive energy through wireless transfer. With reference to FIG. 1, FIG. 6 and FIG. 10, the embodiment 310 receives energy from a plurality of power access points forming a coherent energy bubble 20 at an energy beam antenna 312. The received energy is filtered by a band pass filter (BPF) 214 connected to the energy beam antenna 312 by a connection 316. The BPF 214 is centered on the fundamental frequency (e.g. 5.8 GHz). The filtered output 320 of the BPF 214 is split with a 20 dB coupler 318 to provide an RF signal to an RF to DC converter 322 by a connection 324. Other levels of coupling are envisioned within the scope of this disclosure to the extent that the coupled output 332 is large enough for reliable measurement without unduly removing energy required to power the embodiment 310.

The RF to DC converter 322 supplies DC power to a microprocessor 326 by a connection 328. The 20 dB coupler 318 also supplies a signal to an RSSI 330 by a connection 332. An Analog to Digital Converter (ADC) 334 converts an analog signal 336 output by the RSSI 330 to provide a digital signal 338 to the microprocessor 326. The microprocessor 326 communicates information including the RSSI level and various telematic information (e.g. temperature sensor information) to a communications module 340 by connection 342, which transmits information with the communication antenna 344 over the connection 346. In one embodiment, the communication module 340 uses a Bluetooth protocol. The transmitted RSSI level is received by a power access point operating as a master to provide feedback to adjust the energy beams from the respective power access points to optimize the received power at the device. In various embodiments, telematic information is also shared with the power access point operating as a master, which in some embodiments is relayed back to other devices in an IoT environment. In other embodiments, the telematic information is sent to a central server or RFID reader.

Figure 12:
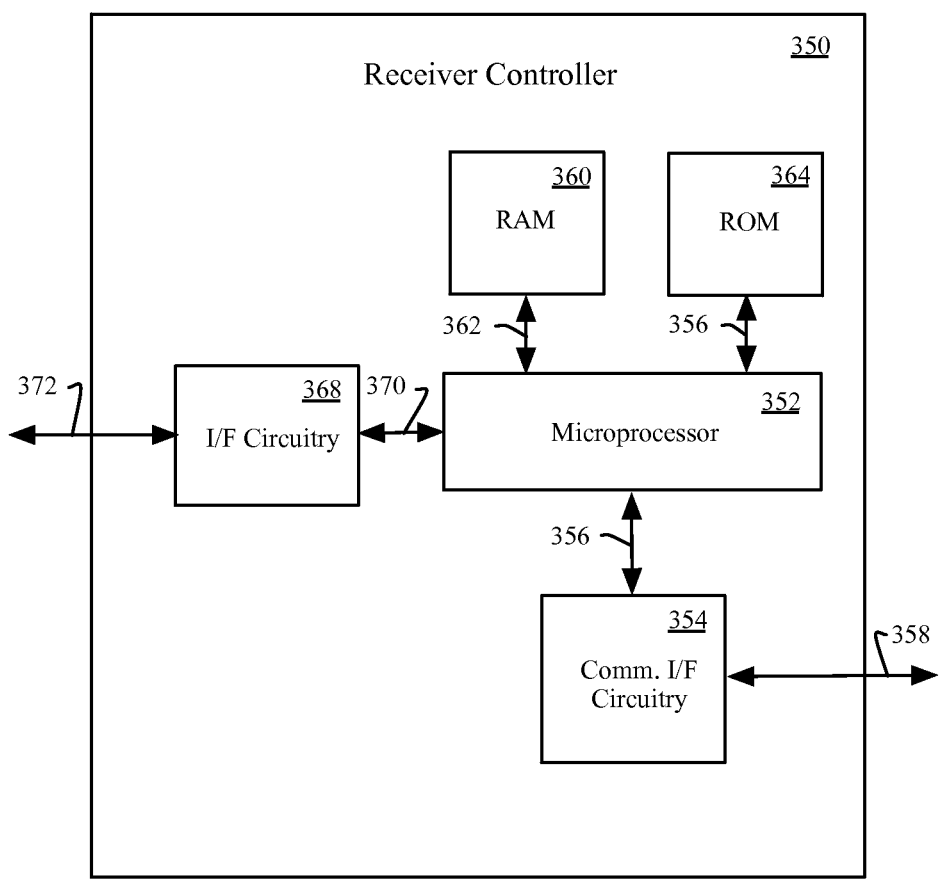
FIG. 12 is a schematic view of a receiver controller.

FIG. 12 shows an embodiment of a receiver controller 350 as used by another embodiment of the energizable device. The receiver controller 350 includes a microprocessor 352 for controlling the various functions of the energizable device and for communicating with the power access point operating as a master. The microprocessor 352 communicates with communication interface (I/F) circuitry 354 over a connection 356. In one embodiment, the communication I/F circuitry 354 provides Bluetooth communication with an antenna over a connection 358. Other communication protocols are envisioned with the scope of this disclosure. The microprocessor 352 communicates with a Random Access Memory (RAM) 360 over a connection 362, and with a Read Only Memory (ROM) 364 over a connection 356. The RAM 360 and the ROM 364 are enabled to store a combination of data and program code. The microprocessor further communicates with I/F circuitry 368 over a connection 370. In one embodiment, the I/F circuitry 368 is an RSSI, which measures the received energy level from a coherent energy bubble 20 received at connection 372. With reference to FIG. 11 and FIG. 12, in some embodiments: microprocessor 326 includes microprocessor 352, RAM 360, and ROM 364; communication I/F circuitry 354 includes communications module 340 and communication antenna 344; and I/F circuitry 368 includes ADC 334.

Figure 13:
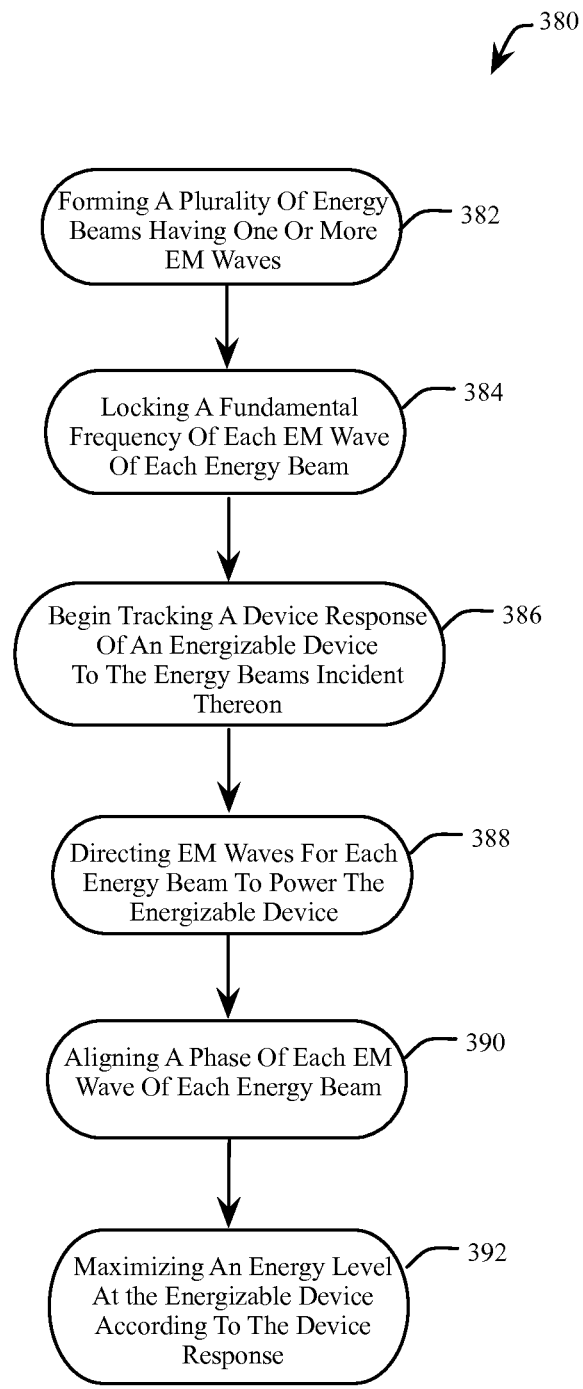
FIG. 13 is a flowchart representation of a method for wireless energy transfer.

FIG. 13 is a flowchart of an example embodiment 380 for a method for wireless energy transfer according to various embodiments of the present disclosure. At 382, a plurality of energy beams having one or more EM waves is formed. At 384, a fundamental frequency of each EM wave of each energy beam is locked. At 386, a device response of an energizable device to the energy beams incident thereon begins to be tracked. At 388, the EM waves for each energy beam are directed to power the energizable device. At 390, a phase of each EM wave of each energy beam is aligned. At 392, an energy level at the energizable device is maximized according to the device response.

Additional Example Embodiments

The following are example embodiments, including at least some explicitly enumerated as "ECs" (Example Combinations), providing additional description of a variety of embodiment types in accordance with the concepts described herein; these examples are not meant to be mutually exclusive, exhaustive, or restrictive; and the invention is not limited to these example embodiments but rather encompasses all possible modifications and variations within the scope of the issued claims and their equivalents. Reference to "wireless power transmitter" and "receiver" in the Additional Example Embodiments are equivalent to "power access point" and "energizable device" respectively.

EC1. A method comprising:
wirelessly transmitting a reference clock signal from a particular one of a plurality of wireless power transmitters to others of the plurality of wireless power transmitters, each of the wireless power transmitters comprising a respective reference clock generator;
at each of the others of the wireless power transmitters, receiving the wirelessly transmitted reference clock signal;
at each of the others of the wireless power transmitters, locking a frequency of the respective reference clock generator according to the received wirelessly transmitted reference clock signal; and
at each of the wireless power transmitters, transmitting a respective wireless power signal to a receiver according to a frequency of the respective reference clock generator.

EC2. The method of EC1, wherein the locking is injection locking.

EC3. The method of EC2, further comprising:
at each of the others of the wireless power transmitters, applying a function of the received wirelessly transmitted reference clock signal to a substrate port of a respective Field Effect Transistor (FET) of the respective reference clock generator to perform the injection locking.

EC4. The method of EC3, wherein the FET is a GaN FET.

EC5. The method of EC3, further comprising:
at each of the others of the wireless power transmitters, deriving the function of the received wirelessly transmitted reference clock signal by frequency multiplying the received wirelessly transmitted reference clock signal by an integer or a rational number.

EC6. The method of EC2, wherein each of the respective reference clock generators comprises a respective oscillator.

EC7. The method of EC6, further comprising:
at each of the others of the wireless power transmitters, deriving a respective desired clock from the received wirelessly transmitted reference clock signal.

EC8. The method of EC7, wherein the respective desired clock is within plus or minus two percent in frequency of a free-running frequency of the respective oscillator.

EC9. The method of EC7, wherein the deriving comprises frequency multiplying the received wirelessly transmitted reference clock signal by an integer or a rational number.

EC10. The method of EC1, wherein each of the respective reference clock generators comprises a respective Phase-Locked Loop (PLL).

EC11. The method of EC10, wherein the locking is performed, at least in part, via the PLL.

EC12. The method of EC1, further comprising:
providing the reference clock signal from the respective reference clock generator of the particular wireless power transmitter.

EC13. The method of EC1, wherein each of the wireless power transmitters is enabled to transmit the respective wireless power signal at a common frequency.

EC14. The method of EC13, wherein the common frequency is a frequency of the respective reference clock generator of the particular wireless power transmitter.

EC15. The method of EC1, further comprising:
at least some of the wireless power transmitters, adjusting a respective phase of the transmitting so that all of the respective wireless power signals are phase-aligned at the receiver.

EC16. The method of EC15, further comprising:
at least some of the wireless power transmitters, receiving respective phase feedback from the receiver and using the respective phase feedback to control the adjusting of the respective phase.

EC17. The method of EC16, further comprising:
at least one of the wireless power transmitters, communicating with the receiver to coordinate production of the respective phase feedback for one or more of the wireless power transmitters.

EC18. The method of EC17, wherein the at least one of the wireless power transmitters is the particular wireless power transmitter.

EC19. The method of EC1, further comprising:
at least some of the wireless power transmitters, adjusting a respective direction of the transmitting so that the respective wireless power signals is directed towards the receiver.

EC20. The method of EC19, further comprising:
at least some of the wireless power transmitters, receiving respective direction feedback from the receiver and using the respective direction feedback to control the adjusting of the respective direction.

EC21. The method of EC20, further comprising:
at least one of the wireless power transmitters, communicating with the receiver to coordinate production of the respective direction feedback for one or more of the wireless power transmitters.

EC22. The method of EC21, wherein the at least one of the wireless power transmitters is the particular wireless power transmitter.

EC23. The method of EC1, further comprising:
operating the respective reference clock generator of the particular wireless transmitter in a master mode.

EC24. The method of EC23, further comprising:
operating the respective reference clock generators of the others of the wireless transmitter in a slave mode.

EC25. A method of synchronizing two or more reference clock generators, comprising:
wirelessly transmitting a reference clock signal from a particular one of the reference clock generators to others of the reference clock generators;
at each of the others of the reference clock generators, receiving the wirelessly transmitted reference clock signal; and
at each of the others of the reference clock generators, locking the reference clock generator according to the received wirelessly transmitted reference clock signal.

EC26. The method of EC25, wherein the locking is injection locking.

EC27. The method of EC25, wherein each of the reference clock generators comprises a respective Phase-Locked Loop (PLL).

EC28. The method of EC1, wherein each of the reference clock generators comprises a respective oscillator.

EC29. A system comprising:
two or more transmitters, each of the transmitters comprising a respective reference clock generator, a respective controller, and a respective antenna;
wherein a particular one of the transmitters is configured to wirelessly transmit a reference clock signal to others of the transmitters;
wherein each of the others of the transmitters is configured to wirelessly receive the transmitted reference clock signal; and
wherein each of the others of the transmitters is configured to lock the respective reference clock generator of the transmitter using the received reference clock signal.

EC30. The system of EC29, wherein the locking is injection locking.

EC31. The system of EC30, wherein, at each of the others of the transmitters, the injection locking comprises applying a function of the received reference clock signal to a substrate port of a FET of the respective reference clock generator.

EC32. The system of EC31, wherein the FET is a GaN FET.

EC33. The system of EC31, wherein the function is a frequency multiplication by an integer or a rational number.

EC34. The system of EC29, wherein each of the respective reference clock generators comprises a respective Phase-Locked Loop (PLL).

EC35. The system of EC34, wherein each of the others of the transmitters is configured to lock the respective reference clock generator of the transmitter via the PLL.

EC36. The system of EC29, wherein each of the respective reference clock generators comprises a respective oscillator.

EC37. The system of EC29, wherein the transmitters are wireless power transmitters.

EC38. The system of EC29, wherein the transmitters are configured to transmit via the respective antenna according to a frequency of operation of the respective reference clock generator of the transmitter.

EC39. The system of EC29, wherein the transmitters are configured to wirelessly transmit power via the respective antenna according to a frequency of operation of the respective reference clock generator of the transmitter.

EC40. The system of any of EC38 or EC39, wherein the reference clock signal is orthogonal in frequency to the frequency of operation of the respective reference clock generator of the particular transmitter.

EC41. The system of EC40, wherein a frequency of the reference clock signal is an integer divisor of the frequency of operation of the respective reference clock generator of the particular transmitter.

EC42. The system of EC29, wherein the respective antenna is a directional antenna.

EC43. The system of EC42, wherein the respective antenna is a phased array antenna.

EC44. The system of EC42, wherein the respective antenna is a switched beam antenna.

EC45. The system of EC42, wherein the respective antenna uses beamforming.

EC46. The system of EC29, wherein each of the transmitters further comprises one or more of a respective power management circuit and a respective power transmitting circuit.

EC47. The system of EC46, wherein the respective power management circuit is enabled to receive power from a wall socket.

EC48. The system of EC46, wherein the respective power transmitting circuit is coupled between the respective power management circuit and the respective antenna.

EC49. The system of EC29, wherein the respective controller comprises a microprocessor.

EC50. The system of EC29, wherein the respective controller is enabled to control operation of the associated transmitter.

EC51. The system of EC29, wherein each of the transmitters further comprises a respective communication interface.

EC52. The system of EC49, wherein the respective controllers are enabled to communicate among the transmitters via the respective communication interfaces.

EC53. The system of EC29, wherein the respective controllers are configured to coordinate to control the system.

EC54. The system of EC53,
wherein each of the transmitters is configured to transmit a respective wireless power signal to a receiver; and
wherein the respective controllers are configured to individually and/or to cooperatively perform respective operations comprising one or more of:
detecting a presence of ones of the transmitters;
detecting a presence of the receiver;
electing a master one of the transmitters, wherein the particular transmitter is the master transmitter;
enabling the master transmitter to wirelessly transmit the reference clock signal to others of the transmitters;
enabling the others of the transmitters to wirelessly receive the transmitted reference clock signal;
enabling the others of the transmitters to lock the respective reference clock generator of the transmitter using the received reference clock signal;
allocating one or more of the transmitters to wirelessly transmit power to the receiver;
at each of the one or more transmitters, determining a respective bearing to the receiver;
at each of the one or more transmitters, orienting the respective antenna according to the respective bearing;
at each of at least some of the one or more transmitters, determining a respective transmission phase of the respective wireless power signal so as to phase-align all of the respective wireless power signals of the one or more transmitters at the receiver;
at each of at least some of the one or more transmitters, setting a phase of the respective wireless power signal to the respective transmission phase;
enabling each of the one or more transmitters to wirelessly transmit power to the receiver;
monitoring a RSSI of the respective wireless power signals as seen at the receiver;
adjusting parameters of the system according to the monitored RSSI;
periodically and/or according to the monitored RSSI and/or according to other changes of the system, repeating any one or more of the preceding;
monitoring health of the system;
communicating heartbeats among the transmitters;
determining if one of the transmitters leaves the system;
determining if one of the receivers leaves the system;
determining if a new transmitter enters the system;
determining if a new receiver enters the system; and
other system activities.

EC55. The system of EC54, wherein each of the respective controllers comprises a respective microprocessor and a respective non-transitory, computer-readable medium containing instructions enabling the microprocessor to perform the respective operations.

EC56. The system of EC55, wherein the non-transitory, computer-readable medium is a Read-Only Memory (ROM).

EC57. The system of EC55, wherein the non-transitory, computer-readable medium comprises flash memory.

EC58. The system of EC29, wherein the particular transmitter is configured to continuously, during a period when locking of the particular transmitters and the others of the transmitters is desired, wirelessly transmit the reference clock signal to the others of the transmitters.

EC59. The system of EC58, wherein each of the others of the transmitters is configured to continually use the received reference clock signal to lock the respective reference clock generator of the transmitter.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A system for wireless energy transfer comprising:
   a tracking module configured to determine a device response of an energizable device to an energy beam incident thereon, the energy beam comprising a plurality of electromagnetic (EM) waves;
   a first beamforming module configured to direct a first one of the plurality of EM waves to power the energizable device;
   a second beamforming module physically separate from the first beamforming module and configured to direct a second one of the plurality of EM waves to power the energizable device, wherein the first EM wave has a first fundamental frequency equal to a second fundamental frequency of the second EM wave;
   a phase alignment module configured to align for an in-phase arrival at the device, a first phase of the first EM wave with a second phase of the second EM wave; and
   a processing module configured to communicate with at least one of the tracking module, the first beamforming module, the second beamforming module and the phase alignment module to maximize a received power level received by the energizable device according to the device response, the received power level proportional to a transmitted power level of the energy beam formed from a first energy beam including the first EM wave and a second energy beam including the second EM wave, wherein a first energy bubble is formed at the energizable device and a second energy bubble is formed at a second energizable device.

2. The system of claim 1 further comprising a frequency management module configured to align the second fundamental frequency to be equal to the first fundamental frequency by using Wireless Injection Locking (WIL).

3. The system of claim 1 further comprising a polarization alignment module configured to align a first polarity of the first EM wave with a second polarity of the second EM wave.

4. The system of claim 1 wherein each of the first energy beam and the second energy beam are narrow angle beams.

5. The system of claim 1 wherein each of the first energy beam and the second energy beam further comprise a plurality of frequencies being rationally-related to the first fundamental frequency and the second fundamental frequency respectively.

6. The system of claim 1 wherein the processing module is configured to receive a Received Signal Strength Indication (RSSI) from the energizable device, and the processing module is configured to adjust one or more of the tracking module, the first beamforming module, the second beamforming module and the phase alignment module to maximize the RSSI value.

7. The system of claim 1 wherein the processing module is configured to receive a telemetry data from the energizable device.

8. The system of claim 1 wherein the processing module is configured to communicate with the first beamforming module, a second processing module is configured to communicate with the second beamforming module, and the processing module is configured to communicate with the second processing module.

9. A method for wireless energy transfer comprising:
  forming a plurality of energy beams, each energy beam comprising one or more electromagnetic (EM) waves having a same fundamental frequency as a fundamental frequency of another EM wave of another one of the energy beams;
  tracking a device response of an energizable device to the plurality of energy beams incident thereon;
  directing the one or more EM waves for each of the plurality of energy beams, to power the energizable device;
  aligning for an in-phase arrival at the device, a respective phase of the one or more EM waves for at least one of the energy beams to another phase of another EM wave of another one of the energy beams; and
  maximizing a received power level received by the energizable device according to the device response by optimizing for at least one of the energy beams, the directing of the one or more EM waves and the aligning of the phase of the one or more EM waves, wherein a first energy bubble is formed at the energizable device and a second energy bubble is formed at a second energizable device.

10. The method of claim 9 further comprising locking the same fundamental frequency of each EM wave for each energy beam to one another using Wireless Injection Locking (WIL).

11. The method of claim 10 wherein WIL includes modulating a substrate voltage of a field effect transistor (FET) to alter a bias current of a resonant circuit.

12. The method of claim 9 further comprising aligning a respective polarity of the one or more EM waves for the at least one of the energy beams to another polarity of the another EM wave of the another one of the energy beams.

13. The method of claim 9 wherein the device response includes receiving a backscattered EM wave from the energizable device as a Received Signal Strength Indicator (RSSI).

14. The method of claim 9 further comprising aligning a respective polarity of each of the EM waves for the at least one of the energy beams to the EM waves of another of the energy beams.

15. The method of claim 9 further comprising receiving from the energizable device a telemetry data to adjust a transmitted power level of each of the energy beams.

16. A method for wireless communication comprising:
  forming a plurality of energy beams, each energy beam comprising one or more electromagnetic (EM) waves;
  matching with Wireless Injection Locking (WIL) a respective fundamental frequency of each of the EM waves for at least one of the energy beams to a fundamental frequency the EM waves of another one of the energy beams;
  tracking a device response for each of a plurality of energizable devices, to the plurality of energy beams incident thereon;
  directing the one or more EM waves for each of the plurality of energy beams, to power at least one energizable device;
  aligning for an in-phase arrival at the device, a respective phase of each of the EM waves for the at least one of the energy beams to another phase of another EM wave of the another one of the energy beams; and
  maximizing a received power level received by each of the energizable devices according to their respective device response by optimizing the aligning of the phase of each of the EM waves for at least one of the energy beams, wherein a first energy bubble is formed at the energizable device and a second energy bubble is formed at a second energizable device.

17. The method of claim 16 further comprising receiving, at a power access point, from at least one of the energizable devices a telemetry data, the power access point capable of at least one of tracking of one of the device responses, the forming of one of the plurality of energy beams and the aligning of the phase of each of the EM waves for an at least two of the energy beams.

18. The method of claim 16 further comprising aligning a respective polarity of the one or more EM waves for the at least one of the energy beams to another polarity of the another EM wave of the another one of the energy beams.

19. The method of claim 16 wherein the at least one energy beam is directed to more than one of the energizable devices on a time-shared basis.

20. The method of claim 16 wherein the at least one energy beam is directed to a new energizable device in response to a relocation of one of the plurality of energizable devices.

* * * * *